(12) United States Patent
Fang et al.

(10) Patent No.: US 12,019,044 B2
(45) Date of Patent: Jun. 25, 2024

(54) DEFECT DETECTION METHOD, APPARATUS, AND DEVICE FOR SEMI-CONDUCTING BEDDING LAYER OF POWER CABLE

(71) Applicants: Electric Power Science & Research Institute of State Grid Tianjin Electric Power Company, Tianjin (CN); State Grid Tianjin Electric Power Company, Tianjin (CN)

(72) Inventors: Shengchen Fang, Tianjin (CN); Pengxian Song, Tianjin (CN); Xu Li, Tianjin (CN); Yang Yu, Tianjin (CN); Mingzheng Zhu, Tianjin (CN); Zhengzheng Meng, Tianjin (CN); Fengzheng Zhou, Tianjin (CN); Xiaohui Zhu, Tianjin (CN); Lei Yang, Tianjin (CN); Jun Zhang, Tianjin (CN); Chun He, Tianjin (CN); Nan Wang, Tianjin (CN); Ke Xu, Tianjin (CN); Qinghua Tang, Tianjin (CN); Chi Zhang, Tianjin (CN); Haoming Wang, Tianjin (CN); Longji Li, Tianjin (CN); Cheng Sun, Tianjin (CN); Wei Fan, Tianjin (CN)

(73) Assignees: Electric Power Science & Research Institute of State Grid Tianjin Electric Power Company, Tianjin (CN); State Grid Tianjin Electric Power Company, Tianjin (CN)

( * ) Notice: Subject to any disclaimer, the term of this patent is extended or adjusted under 35 U.S.C. 154(b) by 0 days.

(21) Appl. No.: 17/776,221

(22) PCT Filed: Jan. 21, 2022

(86) PCT No.: PCT/CN2022/073086
§ 371 (c)(1),
(2) Date: May 11, 2022

(87) PCT Pub. No.: WO2023/050659
PCT Pub. Date: Apr. 6, 2023

(65) Prior Publication Data
US 2024/0175839 A1 May 30, 2024

(30) Foreign Application Priority Data
Sep. 29, 2021 (CN) .......................... 202111148373.X

(51) Int. Cl.
*G01N 27/20* (2006.01)
*G01N 27/04* (2006.01)
*G06F 17/15* (2006.01)

(52) U.S. Cl.
CPC .......... *G01N 27/20* (2013.01); *G01N 27/041* (2013.01); *G06F 17/15* (2013.01)

(58) Field of Classification Search
CPC ...... G01N 27/04; G01N 27/20; G01N 27/041; G01N 27/205; G06F 17/15
(Continued)

(56) References Cited

FOREIGN PATENT DOCUMENTS

| CN | 110954471 A | * | 4/2020 | ............. G01N 17/02 |
| CN | 112763850 A | * | 5/2021 | ............ G01R 31/088 |
| CN | 112816830 A | * | 5/2021 | ............. G01N 17/02 |

OTHER PUBLICATIONS

English translation of CN110954471A (Year: 2020).*
English translation of CN112816830A (Year: 2021).*
English translation of CN 112763850 A (Year: 2021).*

* cited by examiner

*Primary Examiner* — Eman A Alkafawi
*Assistant Examiner* — Courtney G McDonnough

(57) ABSTRACT

Defect detection method for a semi-conducting bedding layer of a power cable includes: obtaining a length param-
(Continued)

eter, a corrugation pitch parameter, radius parameters, and a thickness parameter of a power cable; obtaining a first resistance value between a shield and a corrugated sheath, and calculating a second resistance value of the shield based on the length parameter and the corrugation pitch parameter; calculating a radial resistance value of the semi-conducting bedding layer based on the first resistance value and the second resistance value; determining a contact angle of a critical point of contact between the corrugated sheath and the semi-conducting bedding layer based on the radius parameters and the thickness parameter; calculating volume resistivity of the semi-conducting bedding layer based on the radial resistance value and the contact angle; and comparing the volume resistivity with a preset evaluation parameter to obtain a defect detection result of the semi-conducting bedding layer.

20 Claims, 9 Drawing Sheets

(58) Field of Classification Search
USPC .......................................................... 324/537
See application file for complete search history.

DEFECT DETECTION METHOD, APPARATUS, AND DEVICE FOR SEMI-CONDUCTING BEDDING LAYER OF POWER CABLE

TECHNICAL FIELD

The present disclosure relates to the technical field of power cables, and in particular, to a defect detection method, apparatus, and device for a semi-conducting bedding layer of a power cable.

BACKGROUND

With the rapid development of China's economy, there are increasing power demands and higher requirements for transmission quality and reliability. Power cable transmission lines are basically used in an urban transmission network, which are characterized by stable transmission performance, high security, and strong adaptability. In a power cable transmission line, a semi-conducting bedding layer of a power cable not only undertakes a function of buffering mechanical force, but also realizes an electrical connection between an insulation shield and a metallic sheath. In recent years, increasing faults are caused by ablation of a semi-conducting bedding layer of a high-voltage power cable, and a potential ablation risk of the semi-conducting bedding layer has become one of major potential risks threatening safety of a power grid. Main potential ablation risks of the semi-conducting bedding layer include ablation due to partial discharge, current-induced thermal ablation, and electrochemical ablation. All these potential risks are caused by a serious increase in volume resistivity after the semi-conducting bedding layer is damped. The increase in the volume resistivity makes it impossible to form an effective electrical connection between the insulation shielding layer and the metallic sheath, resulting in a fault. Therefore, whether there is an ablation defect in the power cable can be directly reflected by calculating the volume resistivity of the semi-conducting bedding layer.

Power cable suppliers generally use metallic corrugated production lines to produce corrugated sheaths, and control technical parameters of sheath corrugations by two production parameters, namely, a corrugation pitch and a corrugation depth. This method cannot directly determine a smooth corrugation that takes a radius of curvature as a typical shape parameter. Moreover, due to crest and trough positions of the corrugated sheath, the power cable is generally in discontinuous contact with the semi-conducting bedding layer in a longitudinal direction of the power cable. These problems make it difficult to perform mathematical modeling and calculation on a volume of air between the corrugated sheath and the semi-conducting bedding layer, and as a result, the calculated volume resistivity is inaccurate. At present, most studies focus on analyzing an electric field of an insulation part of the power cable, but less analyze an electric field in the semi-conducting bedding layer, and early power cables lack production test reports and other information, resulting in incomplete basic data of the power cables. This makes it difficult to provide sufficient information for calculating the volume resistivity, and makes it impossible to accurately calculate the volume resistivity. As a result, it is impossible to accurately determine whether there is an ablation defect in the semi-conducting bedding layer of the power cable.

SUMMARY

Embodiments of the present disclosure are intended to provide a defect detection method, apparatus, and device for a semi-conducting bedding layer of a power cable, to accurately calculate volume resistivity of a semi-conducting bedding layer of a power cable, so as to accurately determine, based on the volume resistivity, whether there is a potential ablation risk in the semi-conducting bedding layer of the power cable.

To achieve the above objective, the embodiments of the present disclosure provide a defect detection method for a semi-conducting bedding layer of a power cable, including:

obtaining a length parameter, a corrugation pitch parameter, radius parameters, and a thickness parameter of a power cable, where the power cable includes a shielding layer, a corrugated sheath, and a semi-conducting bedding layer between the shielding layer and the corrugated sheath;

obtaining a first resistance value between the shielding layer and the corrugated sheath, and calculating a second resistance value of the shielding layer based on the length parameter and the corrugation pitch parameter;

calculating a radial resistance value of the semi-conducting bedding layer based on the first resistance value and the second resistance value;

determining a contact angle of a critical point of contact between the corrugated sheath and the semi-conducting bedding layer based on the radius parameters and the thickness parameter;

calculating volume resistivity of the semi-conducting bedding layer based on the radial resistance value and the contact angle; and comparing the volume resistivity with a preset evaluation parameter to obtain a defect detection result of the semi-conducting bedding layer.

As an improvement to the above solution, before the calculating volume resistivity of the semi-conducting bedding layer based on the radial resistance value and the contact angle, the method further includes:

taking a plurality of points on a contact surface between the semi-conducting bedding layer and the corrugated sheath as base interpolation points;

taking an average value of the base interpolation points to obtain an interpolation data point; and obtaining coordinates of the interpolation data point, and constructing an interpolation function based on coordinates of a plurality of interpolation data points.

As an improvement to the above solution, the calculating volume resistivity of the semi-conducting bedding layer based on the radial resistance value and the contact angle includes:

calculating first volume resistivity of the semi-conducting bedding layer in a resistance approximation mode based on the interpolation function, the radial resistance value, and the contact angle; and calculating second volume resistivity of the semi-conducting bedding layer in a conductance approximation mode based on the interpolation function, the radial resistance value, and the contact angle.

As an improvement to the above solution, the first volume resistivity satisfies the following formula:

$$\delta_{HR} = 8R_H \int_0^{\theta_A} \int_0^{rf} \left( \sqrt{d_{O'C}^2 - \sin^2\theta d_{OO'}^2} + d_{OO'} \cos\theta \right) - \varepsilon$$

-continued $$\frac{\frac{1}{\left(f^{-1}(z) - \sqrt{d_{OB'}^2 - \sin^2\theta d_{OO'}^2} - d_{OO'}\cos\theta\right)}}{\left(\frac{1}{\sqrt{1 + \left(\frac{df^{-1}(z)}{dz}\right)^2} f^{-1}(z)} + \frac{1}{\sqrt{d_{O'B}^2 - \sin^2\theta d_{OO'}^2} - d_{OO'}\cos\theta}\right)} dzd\theta$$

where $\delta_{HR}$ represents the first volume resistivity; $R_H$ represents the radial resistance value; $\theta_A$ represents the contact angle; $d_{O'C}$ represents a first outer radius of the power cable containing the semi-conducting bedding layer; $d_{O'B}$ represents a second outer radius of the power cable containing the shielding layer; $d_{OO'}$ represents a distance between a center of a circle of the corrugated sheath and a center of a circle of a power cable conductor; ε represents a correction value of an upper integral limit, which is a constant; $f(\rho)$ represents a first interpolation function, and $\rho = \sqrt{d_{o'c}^2 - \sin^2\theta d_{oo'}^2} + d_{oo'}\cos\theta$; and $f^{-1}(z)$ represents a second interpolation function.

As an improvement to the above solution, the second volume resistivity satisfies the following formula:

$$\delta_{HC} = 2R_H \int_0^{\theta_A} \int_0^{f\left(\sqrt{d_{O'C}^2 - \sin^2\theta d_{OO'}^2} + d_{OO'}\cos\theta\right) - \varepsilon}$$

$$\frac{\sqrt{1 + \left(\frac{df^{-1}(z)}{dz}\right)^2} f^{-1}(z) + \sqrt{d_{O'B}^2 - \sin^2\theta d_{OO'}^2} + d_{OO'}\cos\theta}{f^{-1}(z) - \sqrt{d_{O'B}^2 - \sin^2\theta d_{OO'}^2} - d_{OO'}\cos\theta} dzd\theta$$

where $\delta_{HC}$ represents the second volume resistivity; $R_H$ represents the radial resistance value; $\theta_A$ represents the contact angle; $d_{O'C}$ represents a first outer radius of the power cable containing the semi-conducting bedding layer; $d_{O'B}$ represents a second outer radius of the power cable containing the shielding layer; $d_{OO'}$ represents a distance between a center of a circle of the corrugated sheath and a center of a circle of a power cable conductor; ε represents a correction value of an upper integral limit, which is a constant; $f(\rho)$ represents a first interpolation function, and $\rho = \sqrt{d_{o'c}^2 - \sin^2\theta d_{oo'}^2} + d_{oo'}\cos\theta$; and $f^{-1}(z)$ represents a second interpolation function.

As an improvement to the above solution, the comparing the volume resistivity with a preset evaluation parameter to obtain a defect detection result of the semi-conducting bedding layer includes:
determining total volume resistivity of the semi-conducting bedding layer based on the first volume resistivity and the second volume resistivity; and
when the total volume resistivity is less than or equal to the evaluation parameter, determining that there is no defect in the semi-conducting bedding layer; or
when the total volume resistivity is greater than the evaluation parameter, determining that there is a defect in the semi-conducting bedding layer.

As an improvement to the above solution, the total volume resistivity of the semi-conducting bedding layer determined based on the first volume resistivity and the second volume resistivity satisfies the following formula:

$$\delta_H = w\delta_{HR} + (1-w)\delta_{HC}$$

where $\delta_H$ represents the total volume resistivity; w represents a weight coefficient, and w∈ [0, 1]; $\delta_{HR}$ represents the first volume resistivity; and $\delta_{HC}$ represents the second volume resistivity.

As an improvement to the above solution, the radius parameters include an inner radius of the corrugated sheath, a first outer radius of the power cable containing the semi-conducting bedding layer, and a second outer radius of the power cable containing the shielding layer, and the thickness parameter is a minimum value of a thickness of the semi-conducting bedding layer; and the determining a contact angle of a critical point of contact between the corrugated sheath and the semi-conducting bedding layer based on the radius parameters and the thickness parameter includes:
calculating a sum of the thickness parameter, the first outer radius, and the second outer radius; and
when the sum of the thickness parameter, the first outer radius, and the second outer radius is greater than a preset parameter threshold, determining that the contact angle of the critical point of contact between the corrugated sheath and the semi-conducting bedding layer is x, where the parameter threshold is a multiple of the inner radius.

As an improvement to the above solution, the determining a contact angle of a critical point of contact between the corrugated sheath and the semi-conducting bedding layer based on the radius parameters and the thickness parameter further includes:
when the sum of the thickness parameter, the first outer radius, and the second outer radius is less than or equal to the preset parameter threshold, calculating a distance between a center of a circle of the corrugated sheath and a center of a circle of a power cable conductor based on the inner radius, the thickness parameter, and the second outer radius; and
calculating the contact angle of the critical point of contact between the corrugated sheath and the semi-conducting bedding layer based on the distance between the center of the circle of the corrugated sheath and the center of the circle of the power cable conductor, the inner radius, and the first outer radius, where the contact angle satisfies the following formula:

$$\theta_A = \arccos\left(\frac{d_{OO'}^2 + d_{OA}^2 - d_{O'C}^2}{2d_{OO'}d_{OA}}\right)$$

where $\theta_A$ represents the contact angle; $d_{OO'}$ represents the distance between the center of the circle of the corrugated sheath and the center of the circle of the power cable conductor; $d_{OA}$ represents the inner radius; and $d_{O'C}$ represents the first outer radius.

As an improvement to the above solution, a method for obtaining the first resistance value includes:
connecting a conductor mesh belt to the corrugated sheath and the shield at a first end of the power cable separately, and connecting the two conductor mesh belts to two terminals of a direct current (DC) resistance tester respectively for resistance measurement to obtain a plurality of first measured values;
connecting a conductor mesh belt to the corrugated sheath and the shield at a second end of the power cable separately, and connecting the two conductor mesh belts to the two terminals of the DC resistance tester respectively for resistance measurement to obtain a plurality of second measured values; and taking an average value of the first measured values and the second measured values as the first resistance value.

As an improvement to the above solution, the calculating a second resistance value of the shield based on the length parameter and the corrugation pitch parameter includes:
connecting a conductor mesh belt to the shield and a power cable conductor at each end of the power cable separately;
connecting conductor mesh belts of the shield and the power cable conductor at a first end of the power cable together, and connecting conductor mesh belts of the shield and the power cable conductor at a second end of the power cable to two terminals of a DC resistance tester respectively for resistance measurement to obtain a plurality of third measured values;
connecting the conductor mesh belts of the shield and the power cable conductor at the second end of the power cable together, and connecting the conductor mesh belts of the shield and the power cable conductor at the first end of the power cable to the two terminals of the DC resistance tester respectively for resistance measurement to obtain a plurality of fourth measured values; and
calculating the second resistance value based on an average value of the third measured values and the fourth measured values, the length parameter, and the corrugation pitch parameter.

As an improvement to the above solution, the calculating a second resistance value of the shield based on the length parameter and the corrugation pitch parameter includes:
obtaining volume resistivity and a thickness of the shield; and
calculating the second resistance value based on the length parameter, the corrugation pitch parameter, a second outer radius of the power cable containing the shield, and the volume resistivity and the thickness of the shield, where
the second resistance value satisfies the following formula:

$$2nR_P = \frac{\delta_P d_{cable}}{\pi(d_{O'B}^2 - (d_{O'B} - t_P)^2)}$$

where $R_P$ represents the second resistance value; n represents a quantity of corrugations, and $$n = \left\lfloor \frac{d_{cable}}{d_{len}} \right\rfloor \text{ or } n = \left\lceil \frac{d_{cable}}{d_{len}} \right\rceil;$$

$d_{cable}$ represents the length parameter; dien represents the corrugation pitch parameter; dos represents the second outer radius of the power cable containing the shield; $\delta_P$ represents the volume resistivity of the shield; and $t_P$ represents the thickness of the shield.

As an improvement to the above solution, the calculating a radial resistance value of the semi-conducting bedding layer based on the first resistance value and the second resistance value includes:
constructing an initial equation of a preset radial resistance value based on the first resistance value and the second resistance value;
constructing a solving equation of the radial resistance value based on the first resistance value; and
calculating the radial resistance value based on the initial equation and the solving equation.

To achieve the above objective, the embodiments of the present disclosure further provide a defect detection apparatus for a semi-conducting bedding layer of a power cable, including:
a parameter obtaining module, configured to obtain a length parameter, a corrugation pitch parameter, radius parameters, and a thickness parameter of a power cable;
a first resistance value obtaining module, configured to obtain a first resistance value between a shield and a corrugated sheath;
a second resistance value calculation module, configured to calculate a second resistance value of the shield based on the length parameter and the corrugation pitch parameter;
a radial resistance value calculation module, configured to calculate a radial resistance value of a semi-conducting bedding layer based on the first resistance value and the second resistance value;
a contact angle determining module, configured to determine a contact angle of a critical point of contact between the corrugated sheath and the semi-conducting bedding layer based on the radius parameters and the thickness parameter;
a volume resistivity calculation module, configured to calculate volume resistivity of the semi-conducting bedding layer based on the radial resistance value and the contact angle; and
a defect detection module, configured to compare the volume resistivity with a preset evaluation parameter to obtain a defect detection result of the semi-conducting bedding layer.

To achieve the above objective, the embodiments of the present disclosure further provide a defect detection device for a semi-conducting bedding layer of a power cable, including a processor, a memory, and a computer program stored in the memory and configured to be executed by the processor, where the processor executes the computer program to implement the defect detection method for a semi-conducting bedding layer of a power cable in any one of the above embodiments.

Compared with the prior art, the defect detection method, apparatus, and device for a semi-conducting bedding layer of a power cable disclosed in the embodiments of the present disclosure obtain size information of the power cable and determine the contact angle of the critical point of contact between the semi-conducting bedding layer and the corrugated sheath based on the size information; calculate the radial resistance value of the semi-conducting bedding layer in a single corrugation pitch based on a DC resistance measurement result of a single port of a finished high-voltage power cable; and finally calculate the volume resistivity of the semi-conducting bedding layer based on the radial resistance value and the contact angle, and obtain the defect detection result of the semi-conducting bedding layer based on a comparison result of the evaluation parameter and the volume resistivity of the semi-conducting bedding layer. The defect detection method, apparatus, and device for a semi-conducting bedding layer of a power cable disclosed in the embodiments of the present disclosure can accurately calculate the volume resistivity of the semi-conducting bedding layer of the power cable, so as to accurately determine, based on the volume resistivity, whether there is a potential ablation risk in the semi-conducting bedding layer of the power cable.

DETAILED DESCRIPTION

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
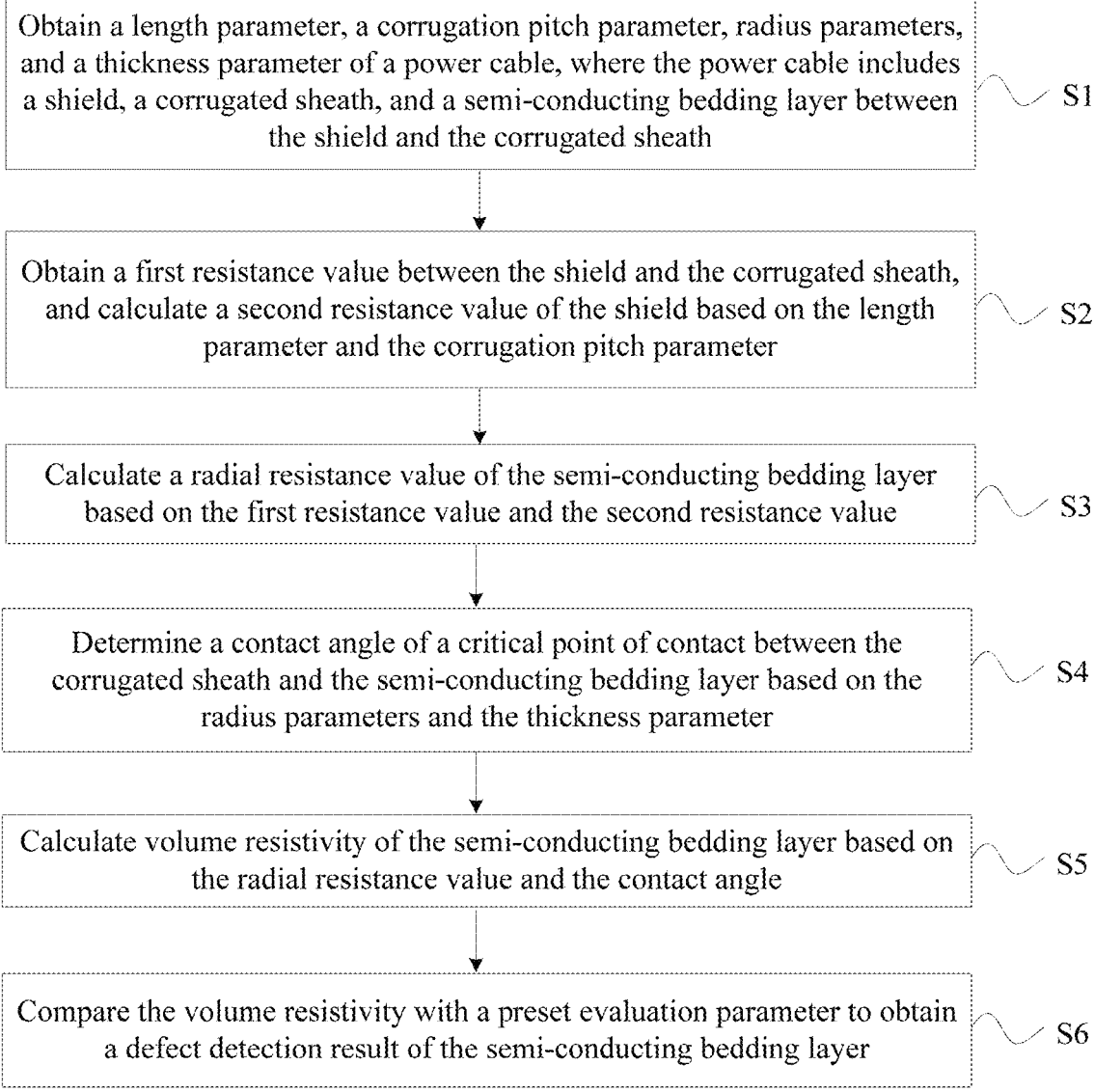
FIG. 1 is a flowchart of a defect detection method for a semi-conducting bedding layer of a power cable according to an embodiment of the present disclosure.

FIG. 1 is a flowchart of a defect detection method for a semi-conducting bedding layer of a power cable according to an embodiment of the present disclosure. The defect detection method for a semi-conducting bedding layer of a power cable includes the following steps:

S1: Obtain a length parameter, a corrugation pitch parameter, radius parameters, and a thickness parameter of a power cable, where the power cable includes a shield, a corrugated sheath, and a semi-conducting bedding layer between the shield and the corrugated sheath.

S2: Obtain a first resistance value between the shield and the corrugated sheath, and calculate a second resistance value of the shield based on the length parameter and the corrugation pitch parameter.

S3: Calculate a radial resistance value of the semi-conducting bedding layer based on the first resistance value and the second resistance value.

S4: Determine a contact angle of a critical point of contact between the corrugated sheath and the semi-conducting bedding layer based on the radius parameters and the thickness parameter.

S5: Calculate volume resistivity of the semi-conducting bedding layer based on the radial resistance value and the contact angle.

S6: Compare the volume resistivity with a preset evaluation parameter to obtain a defect detection result of the semi-conducting bedding layer.

Figure 2:
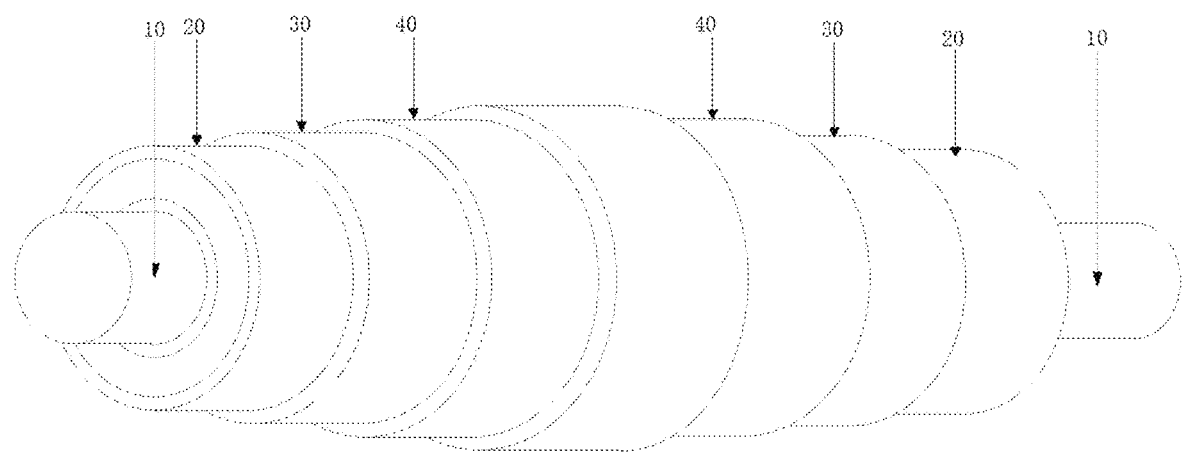
FIG. 2 is a schematic structural diagram of a power cable according to an embodiment of the present disclosure.

Specifically, in step S1, the power cable in this embodiment of the present disclosure includes a conductor 10, the shield 20, the corrugated sheath 40, and the semi-conducting bedding layer 30 between the shield 20 and the corrugated sheath 40, as shown in FIG. 2. Size information of the power cable can be obtained based on a production test report or an actual measurement result of the power cable. The length parameter $d_{cable}$ represents a length of the power cable; the corrugation pitch parameter $d_{len}$ represents a length of two adjacent crests in the corrugated sheath (namely, a length of one corrugation); the radius parameters include an inner radius dos of the corrugated sheath, a first outer radius $d_{O'C}$ of the power cable containing the semi-conducting bedding layer, and a second outer radius $d_{O'B}$ of the power cable containing the shield; and the thickness parameter represents a minimum value of a thickness of the semi-conducting bedding layer, for example, a thickness $d_{BB'}$ of a thinnest point of the semi-conducting bedding layer.

Specifically, in step S2, a method for obtaining the first resistance value includes the following steps S211 to S213:

S211: Connect a conductor mesh belt to the corrugated sheath and the shield at a first end of the power cable separately, and connect the two conductor mesh belts to two terminals of a DC resistance tester respectively for resistance measurement to obtain a plurality of first measured values.

S212: Connect a conductor mesh belt to the corrugated sheath and the shield at a second end of the power cable separately, and connect the two conductor mesh belts to the two terminals of the DC resistance tester respectively for resistance measurement to obtain a plurality of second measured values.

S213: Take an average value of the first measured values and the second measured values as the first resistance value.

Figure 3:
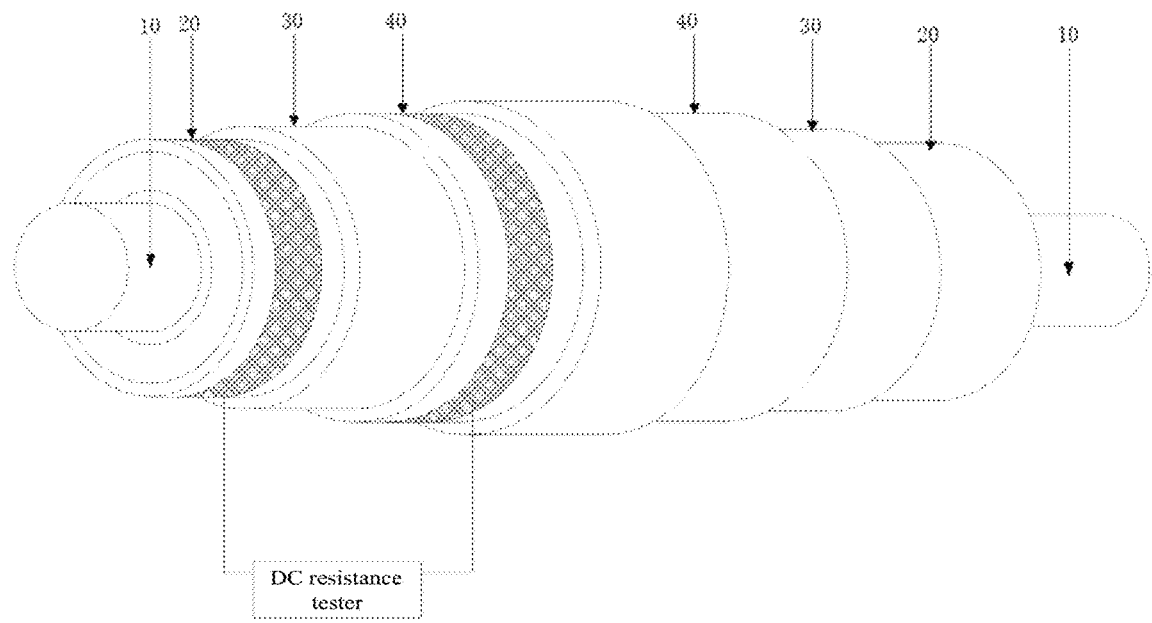
FIG. 3 is a schematic diagram of measuring a first measured value between a shield and a corrugated sheath according to an embodiment of the present disclosure.

For example, a newly delivered power cable and an in-service power cable need to be analyzed, so as to measure DC resistance of a single port network between the shield and the corrugated sheath. (a) For the newly delivered power cable that is laid flat, protective caps at both ends of the power cable or power cable sockets are removed to expose the corrugated sheath and the shield, and then an anti-corrosion protection coat over the corrugated sheath is removed. (b) For the in-service power cable, because power cable connectors or accessories are installed at both ends of the power cable, and both ends of the corrugated sheath need to be grounded or connected to cross interconnection apparatuses. Therefore, before measurement, it is necessary to cut off the power first, take out the power cable from the connectors or accessories, and disconnect the cross interconnection or grounding apparatuses at both ends of the power cable. After that, operations on the newly delivered power cable are the same as those on the in-service power cable. After it is ensured that the corrugated sheaths at both ends are suspended, as shown in FIG. 3, the corrugated sheath and the shield at one end (for example, a left end in FIG. 3) of the power cable each are wrapped with a conductor mesh belt to achieve effective electrical contact. The conductor mesh belt is indicated by a shaded part of FIG. 3.

In this embodiment of the present disclosure, resistance values of the corrugated sheath and the shield are affected when the power cable is damped. Therefore, if resistance values of the corrugated sheath and the shield at a damped end of the power cable are measured, the measured resistance values cannot accurately reflect resistance values of the corrugated sheath and the shield before the power cable is damped. Therefore, it is necessary to conduct resistance measurement at both ends of the power cable for a plurality of times, and finally take an average value as the first resistance value, which can reduce impact of power cable damping on the measured resistance value.

First, a plurality of resistance values of the corrugated sheath and the shield at the first end (for example, the left end in the figure) of the power cable are measured. At this time, the conductor mesh belt is connected to the corrugated sheath and the shield at the first end of the power cable separately, and the two conductor mesh belts are connected to the two terminals of the DC resistance tester respectively for resistance measurement to obtain the plurality of first measured values. Then, a plurality of resistance values of the corrugated sheath and the shield at the second end (for example, a right end in the figure) of the power cable are measured. At this time, the conductor mesh belt is connected to the corrugated sheath and the shield at the second end of the power cable separately, and the two conductor mesh belts are connected to the two terminals of the DC resistance tester respectively for resistance measurement to obtain the plurality of second measured values. Finally, the average value of the first measured values and the second measured values is taken as the first resistance value $R_S$.

It should be noted that the two conductor mesh belts are respectively connected to the two terminals of the DC resistance tester for resistance measurement. During measurement, a DC voltage-stabilized power supply needs to be used to increase a voltage to ensure measurement accuracy. After the measurement, the corrugated sheath and shield should be grounded and discharged to avoid an electric shock. For example, the DC resistance tester may be a Wheatstone bridge or an ohmmeter.

It should be noted that, for a measurement process performed by the DC resistance tester, reference may be made to the prior art, and no specific limitation is imposed in the present disclosure.

Specifically, in a first implementation, the second resistance value is calculated based on an actually measured value. In this case, the calculating a second resistance value of the shield based on the length parameter and the corrugation pitch parameter includes the following steps S221 to S224:

S221: Connect the conductor mesh belt to the shield and a power cable conductor at each end of the power cable separately.

S222: Connect conductor mesh belts of the shield and the power cable conductor at the first end of the power cable together, and connect the conductor mesh belts of the shield and the power cable conductor at the second end of the power cable to the two terminals of the DC resistance tester respectively for resistance measurement to obtain a plurality of third measured values.

S223: Connect the conductor mesh belts of the shield and the power cable conductor at the second end of the power cable together, and connect the conductor mesh belts of the shield and the power cable conductor at the first end of the power cable to the two terminals of the DC resistance tester respectively for resistance measurement to obtain a plurality of fourth measured values.

S224: Calculate the second resistance value based on an average value of the third measured values and the fourth measured values, the length parameter, and the corrugation pitch parameter.

For example, in order to prevent the measured resistance value from failing to accurately reflect the resistance value of the semi-conducting bedding layer due to power cable damping and other reasons, it is necessary to conduct resistance measurement at both ends of the power cable for a plurality of times, and finally take an average value as the second resistance value, which can reduce the impact of power cable damping on the measured resistance value.

Figure 4:
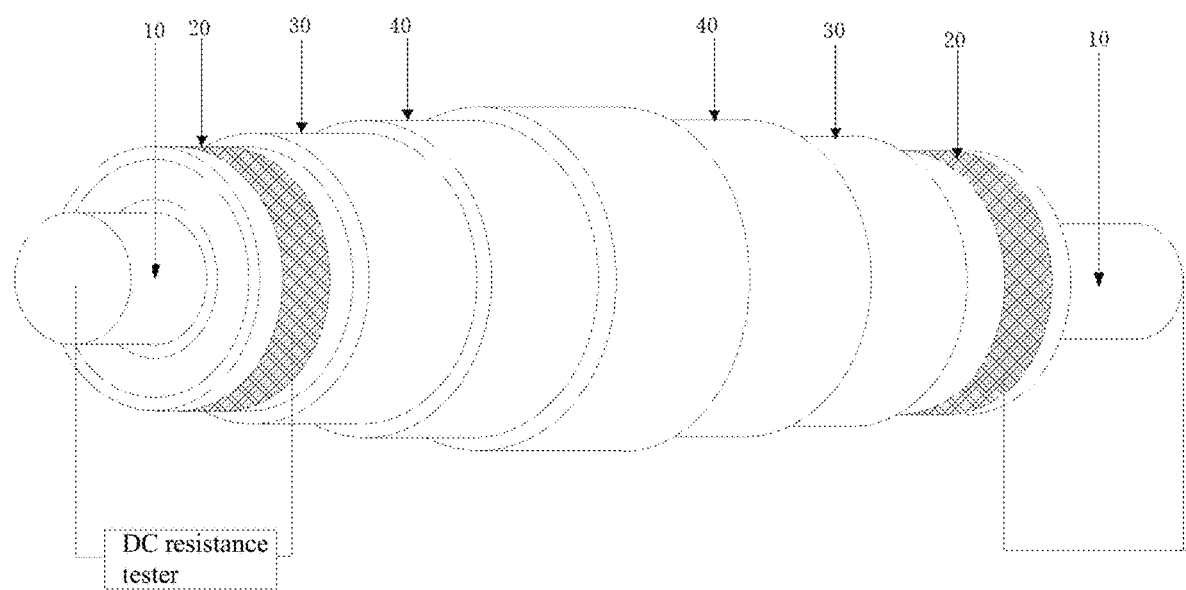
FIG. 4. is a schematic diagram of measuring a third measured value between a shield and a power cable conductor according to an embodiment of the present disclosure.

As shown in FIG. 4, the shield and the power cable conductor at each end of the power cable each are wrapped with the conductor mesh belt. First, the conductor mesh belts of the shield and the power cable conductor at the second end (for example, a right end in FIG. 4) of the power cable are connected together, and the conductor mesh belts of the shield and the power cable conductor at the first end (for example, a left end in FIG. 4) of the power cable are connected to the two terminals of the DC resistance tester respectively for resistance measurement to obtain the plurality of third measured values. Then, the conductor mesh belts of the shield and the power cable conductor at the first end (for example, the left end in FIG. 4) of the power cable are connected together, and the conductor mesh belts of the shield and the power cable conductor at the second end (for example, the right end in FIG. 4) of the power cable are connected to the two terminals of the DC resistance tester respectively for resistance measurement to obtain the plurality of fourth measured values. Finally, the average value $2nR_P$ of the third measured values and the fourth measured values is obtained and used for calculating the second resistance value.

It should be noted that, after the measurement, the shield and the power cable conductor should be grounded and discharged to avoid an electric shock. After the average value of the third measured values and the fourth measured values is obtained, the second resistance value further needs to be calculated based on the average value of the third measured values and the fourth measured values, the length parameter, and the corrugation pitch parameter. In this case, $$n = \left\lfloor \frac{d_{cable}}{d_{len}} \right\rfloor \left( \text{or } n = \left\lceil \frac{d_{cable}}{d_{len}} \right\rceil \right)$$

is satisfied, such that the second resistance value $R_P$ is calculated.

It should be noted that, for a measurement process performed by the DC resistance tester, reference may be made to the prior art, and no specific limitation is imposed in the present disclosure.

Specifically, in a second implementation, the second resistance value is calculated based on volume resistivity & of the shield. In this case, the calculating a second resistance value of the shield based on the length parameter and the corrugation pitch parameter includes the following steps S231 to S232:

S231: Obtain the volume resistivity and a thickness of the shield.

S232: Calculate the second resistance value based on the length parameter, the corrugation pitch parameter, the second outer radius of the power cable containing the shield, and the volume resistivity and the thickness of the shield.

For example, the volume resistivity of the shield is directly provided by a manufacturer at the time of factory shipment. In this case, the volume resistivity op of the shield and the thickness $t_P$ of the shield can be obtained directly. The second resistance value satisfies the following formula:

$$2nR_P = \frac{\delta_P d_{cable}}{\pi(d_{O'B}^2 - (d_{O'B} - t_P)^2)}$$

where $R_P$ represents the second resistance value; n represents a quantity of corrugations, and $$n = \left\lfloor \frac{d_{cable}}{d_{len}} \right\rfloor \text{ or } n = \left\lceil \frac{d_{cable}}{d_{len}} \right\rceil;$$

$d_{cable}$ represents the length parameter; $d_{len}$ represents the corrugation pitch parameter; $d_{O'B}$ represents the second outer radius of the power cable containing the shield; $\delta_P$ represents the volume resistivity of the shield; and $t_P$ represents the thickness of the shield.

Specifically, in step S3, the calculating a radial resistance value of the semi-conducting bedding layer based on the first resistance value and the second resistance value includes the following steps S31 to S33:

S31: Construct an initial equation of a preset radial resistance value based on the first resistance value and the second resistance value, where initial equation satisfies the following formula:

$$\tilde{R}_H = \frac{R_S^2}{R_P} - R_S,$$

and $\tilde{R}_H$ represents an estimated value of $R_H$.

S32: Construct a solving equation of the radial resistance value based on the first resistance value, where the solving equation satisfies the following formula:

$$g(R_H) = R_n(R_H) - R_S = 0.$$

S33: Calculate the radial resistance value $R_H$ based on the initial equation and the solving equation.

Figure 5:
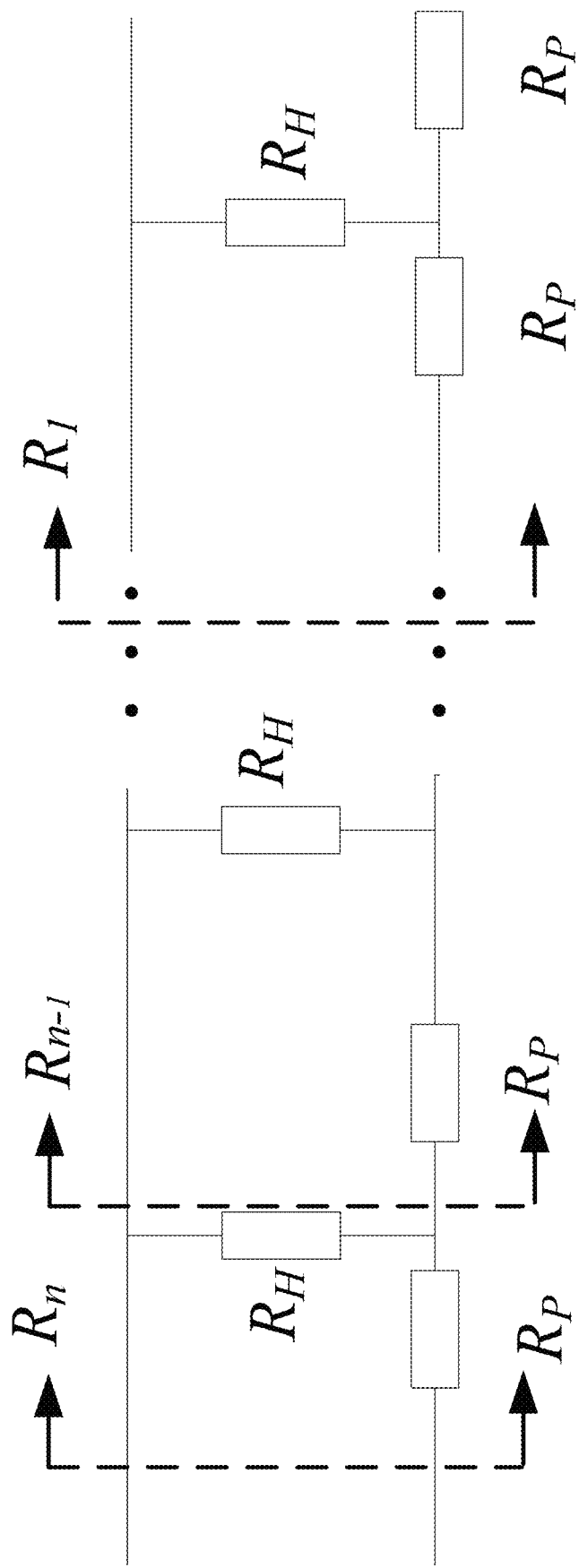
FIG. 5 is a diagram of an equivalent circuit between a corrugated sheath and a shield of a power cable according to an embodiment of the present disclosure.

For example, as shown in FIG. 5, the power cable is equivalent to a circuit. In this case, metallic resistance of the corrugated sheath, longitudinal resistance of the semi-conducting bedding layer, and radial resistance of the shield are ignored. The radial resistance of the semi-conducting bedding layer in each corrugation pitch is denoted as $R_H$, the longitudinal resistance of the insulation shield is denoted as $2R_P$, and $R_n$ is inlet resistance of the single port network.

The following recursive formulas can be found:

$$R_1 = R_H + R_P$$

$$R_2 = \frac{R_1 R_H}{(R_1 + R_H)} + R_P$$

...

$$R_n = \frac{R_{n-1} R_H}{(R_{n-1} + R_H)} + R_P$$

If $R_S$ and $R_P$ are known, a formula $g(R_H) = R_n(R_H) - R_S = 0$ can be defined. In this case, $R_H$ can be obtained by calculating a fixed point of $g(R_H) = 0$.

$$g'(R_H) = \left(\frac{R_{n-1}}{R_{n-1} + R_H}\right)^2$$

can be obtained through deduction. Obviously, $g(R_H)$ is a strictly monotonically increasing and continuously differentiable function, and $g(0) = R_P - R_S < 0$, $\lim_{R_H \to \infty} g(R_H) = \infty$ can be learned based on a physical characteristic of resistance. Therefore, the equation $g(R_H) = 0$ has one and only one solution, thereby ensuring existence and uniqueness of the solution. The equation can be solved by a one-dimensional search method such as a golden section method and its improved form based on function value information, or a one-dimensional nonlinear equation solving method such as a Newton method and its improved form based on function value and gradient information. Generally, the one-dimensional nonlinear equation solving method based on the function value and gradient information has a faster speed. A premise of this kind of method is that an initial point is needed for iterative calculation. A shorter distance between the initial point and an actual solution leads to a fewer iterations and shorter solving time. The following describes a method for selecting the initial point in the present disclosure.

$R_n R_{n-1} + R_n R_H = R_{n-1} R_H + R_{n-1} R_p + R_P R_H$ can be obtained by the above recursive formulas. Because $$\lim_{n \to \infty} R_n = \lim_{n \to \infty} R_{n-1},$$

limit values are taken on both ends of the equation, such that $$R_H = \frac{R_n^2}{R_P} - R_n.$$

Therefore, the estimated value $$\tilde{R}_H = \frac{R_S^2}{R_P} - R_S$$

of $R_H$ is used as an initial value of nonlinear equation solving to perform iterative calculation, thereby greatly reducing a calculation cost. Apparently, when n is large enough, $\tilde{R}_H$ can be directly used as a calculation result of $R_H$.

Specifically, in step S4, the determining a contact angle of a critical point of contact between the corrugated sheath and the semi-conducting bedding layer based on the radius parameters and the thickness parameter includes the following steps S41 to S44:

S41: Calculate a sum of the thickness parameter, the first outer radius, and the second outer radius.

S42: When the sum of the thickness parameter, the first outer radius, and the second outer radius is greater than a preset parameter threshold, determine that the contact angle of the critical point of contact between the corrugated sheath and the semi-conducting bedding layer is π, where the parameter threshold is a multiple of the inner radius.

S43: When the sum of the thickness parameter, the first outer radius, and the second outer radius is less than or equal to the preset parameter threshold, calculate a distance between a center of a circle of the corrugated sheath and a center of a circle of the power cable conductor based on the inner radius, the thickness parameter, and the second outer radius.

S44: Calculate the contact angle of the critical point of contact between the corrugated sheath and the semi-conducting bedding layer based on the distance between the center of the circle of the corrugated sheath and the center of the circle of the power cable conductor, the inner radius, and the first outer radius.

Figure 7:
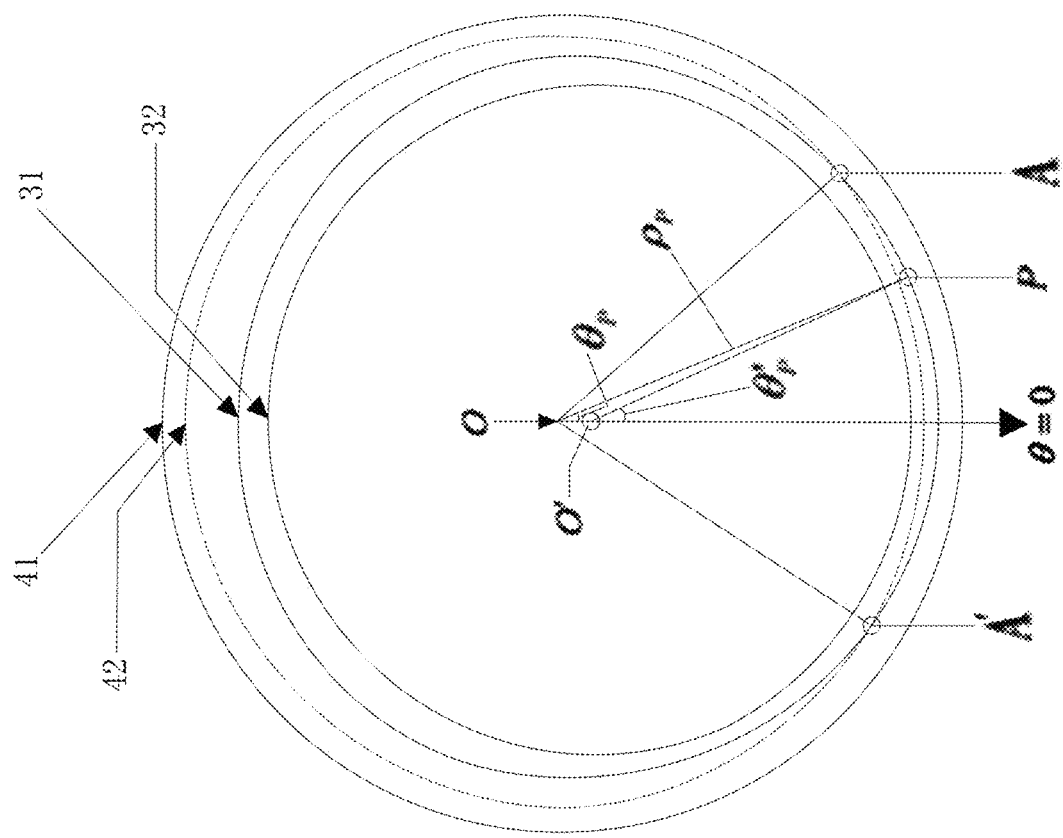
FIG. 7 is a cross-sectional view of a plane of a power cable with a corrugated sheath not in contact with a semi-conducting bedding layer above the power cable according to an embodiment of the present disclosure.
Figure 8:
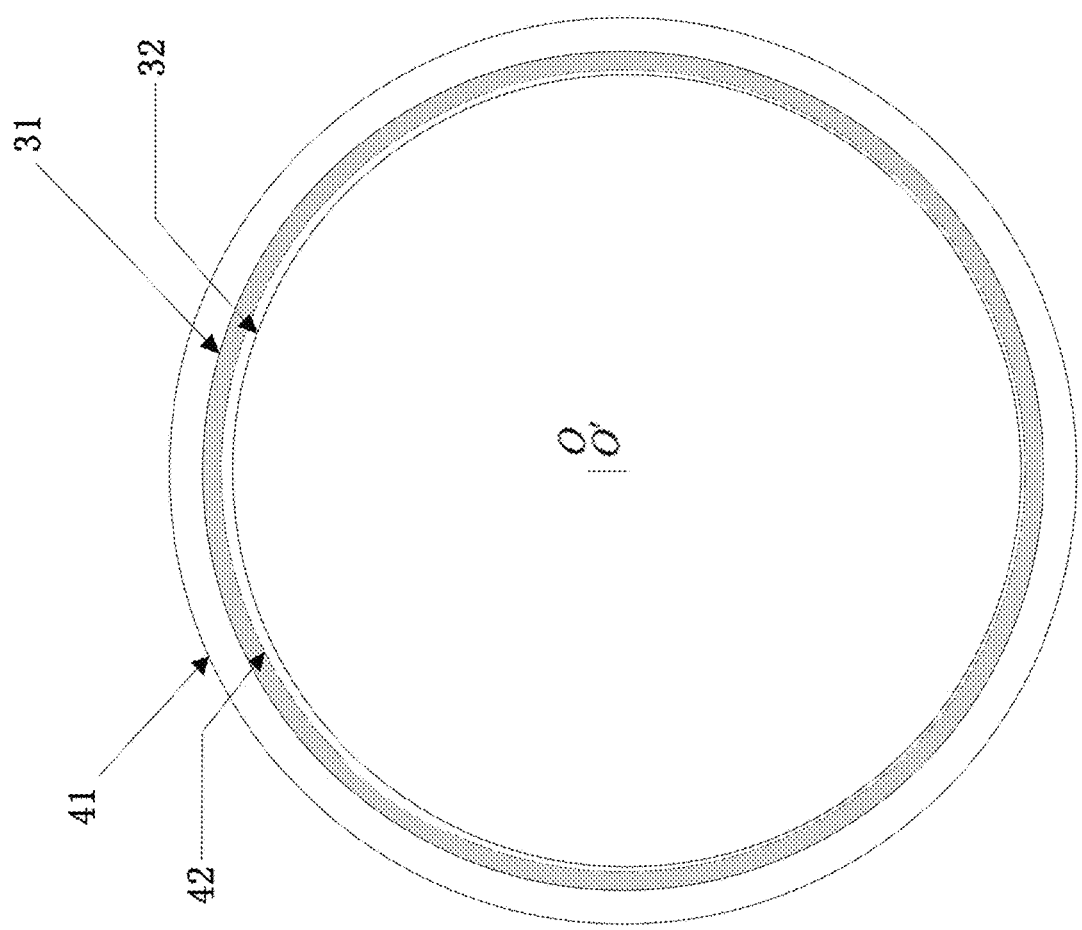
FIG. 8 is a cross-sectional view of a plane of a power cable with a corrugated sheath in contact with a semi-conducting bedding layer above the power cable according to an embodiment of the present disclosure.

At present, there is still no corresponding standard constraint on size matching between the corrugated sheath and the semi-conducting bedding layer. Considering requirements for performance such as mechanical strength and longitudinal water resistance of the power cable, different power cable suppliers adopt different technical schemes on whether a diameter of an inner "trough" of the corrugated sheath is greater than the outer diameter of the power cable containing the semi-conducting bedding layer. Therefore, under the action of gravity, there is no effective contact between an inner side of the corrugated sheath and the semi-conducting bedding layer above power cables of some suppliers, as shown in FIG. 7, and there is effective contact between the inner side of the corrugated sheath and the semi-conducting bedding layer above power cables of some suppliers, as shown in FIG. 8. This embodiment of the present disclosure considers the above two cases and provides a calculation method that can take both cases into account.

Figure 6:
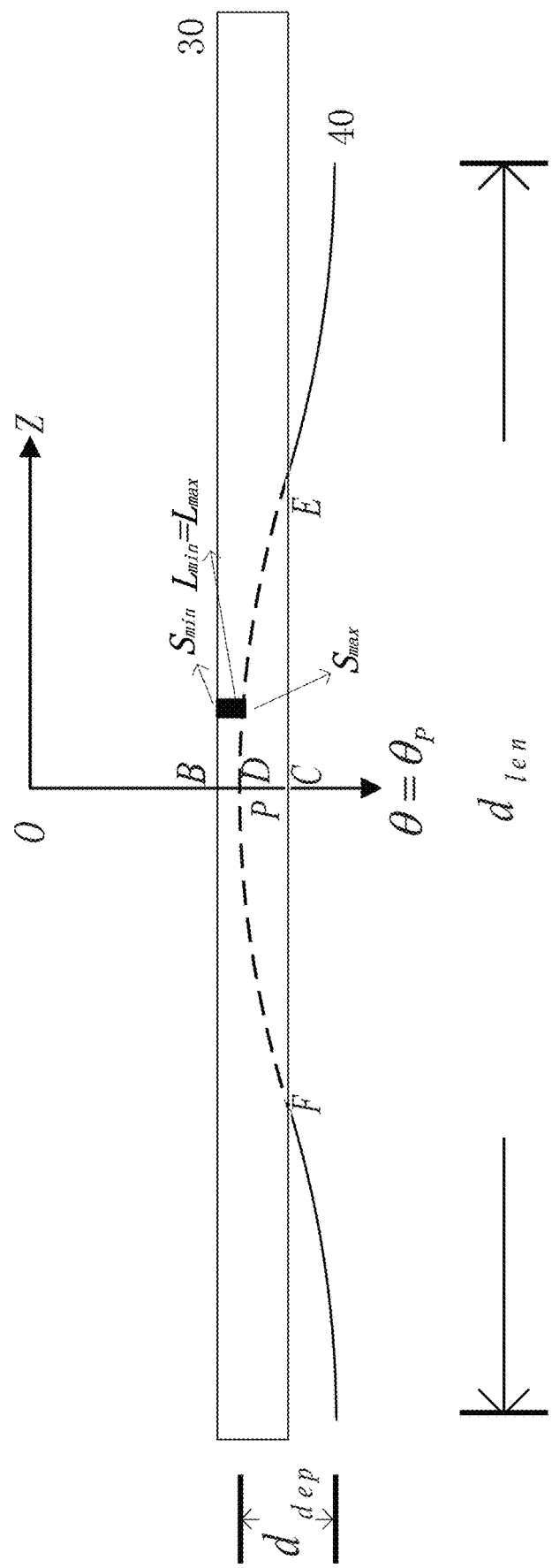
FIG. 6 is a cross-sectional view of a contact surface between a corrugated sheath and a semi-conducting bedding layer on a plane with $\theta=\theta_P$ according to an embodiment of the present disclosure.

For example, as shown in FIG. 6, on a plane with z=0, a ray is made from an origin O to a point P. A point of intersection between the ray and an outer side of the shield is denoted as B; a point of intersection between the ray and an outer side of the semi-conducting bedding layer is denoted as C; a point of intersection between the ray and the inner side of the corrugated sheath is denoted as D; and in a single corrugation pitch, critical positions of contact between the corrugated sheath and the semi-conducting bedding layer are points E and respectively, and $d_{dep}$ represents a corrugation depth. In a direction with θ=0, there is a minimum distance between the two points B and D, which is the thickness of the thinnest point of the semi-conducting bedding layer when the semi-conducting bedding layer is extruded by the gravity, and is denoted as the thickness parameter $d_{BB'}$. In this case, the following formula is satisfied:

$$d_{OO'} = d_{OA} - d_{O'B} - d_{BB'}$$

where $d_{OO'}$ represents the distance between the center of the circle of the corrugated sheath and the center of the circle of the power cable; $d_{O'B}$ represents the second outer radius of the power cable containing the shield; and $d_{OA}$ represents the inner radius of the corrugated sheath.

The following formula can be obtained according to the Cosine Law:

$$\cos(\theta_P) = \frac{d_{OO'}^2 + d_{OB}^2 - d_{O'B}^2}{2 d_{OO'} d_{OB}}$$

where $d_{OB}$ represents a distance between the origin O and the point B, and because $d_{OB}>0$, the following formula can be obtained through deduction:

$$d_{OB} = \sqrt{d_{O'B}^2 - \sin^2\theta_P d_{OO'}^2} + d_{OO'} \cos\theta_P$$

In terms of upper and lower integral limits, similar to $d_{OB}$, $d_{OC}$ can be obtained according to the following formula:

$$d_{OC} = \sqrt{d_{O'C}^2 - \sin^2\theta_P d_{OO'}^2} + d_{OO'} \cos\theta_P$$

where $d_{OC}$ represents a distance between the origin O and the point C, and $d_{O'C}$ represents the first outer radius of the power cable containing the semi-conducting bedding layer.

Considering that a contact surface between the corrugated sheath and the semi-conducting bedding layer is actually a spatial curved surface, in a radial plane of the power cable, a position O of the center of the circle of the corrugated sheath is taken as the origin, and plane polar coordinates can be established, as shown in FIG. 7 or FIG. 8. O' represents a position of the center of circle of the power cable conductor, and critical points of contact between the semi-conducting bedding layer and the corrugated sheath are denoted as A and A'.

Obviously, the above formulas hold true in a range indicated by $0 \leq \theta_P \leq \theta_A$, where $\theta_A$ represents an angle of the point A in FIG. 7 or FIG. 8, and $d_{OA}$ is denoted as the inner radius of the corrugated sheath. The sum of the thickness parameter, the first outer radius, and the second outer radius is calculated, and the sum dD of the thickness parameter, the first outer radius, and the second outer radius satisfies the following formula: $dD = d_{BB'} + d_{O'B} + d_{O'C}$.

It can be found that, as shown in FIG. 7 (in the figure, 41 represents an outer side of the corrugated sheath, 42 represents the inner side of the corrugated sheath, 31 represents the outer side of the semi-conducting bedding layer, and 32 represents an inner side of the semi-conducting bedding layer), when there is no contact between the corrugated sheath and the semi-conducting bedding layer above the power cable, in other words, when $dD \leq 2d_{OA}$, the angle of the critical point A of contact between the corrugated sheath and the semi-conducting bedding layer satisfies the following formula:

$$\theta_A = \arccos\left(\frac{d_{OO'}^2 + d_{OA}^2 - d_{O'C}^2}{2 d_{OO'} d_{OA}}\right)$$

Obviously, as shown in FIG. 8, when there is contact between the corrugated sheath and the semi-conducting bedding layer above the power cable, in other words, when $dD > 2d_{OA}$, $\theta_A = \pi$.

Specifically, before the calculating volume resistivity of the semi-conducting bedding layer based on the radial resistance value and the contact angle, the method further includes the following steps S401 to S403:

S401: Take a plurality of points on the contact surface between the semi-conducting bedding layer and the corrugated sheath as base interpolation points.

S402: Take an average value of the base interpolation points to obtain an interpolation data point.

S403: Obtain coordinates of the interpolation data point, and construct an interpolation function based on coordinates of a plurality of interpolation data points.

For example, as shown in FIG. 6 to FIG. 8, after an interpolation method is determined, the base interpolation point can be determined. Multipoint measurement is actually performed on base interpolation points of a field power cable or a power cable that is of the same type and batch and provided by a supplier in different corrugations, and the plurality of points on the contact surface between the semi-conducting bedding layer and the corrugated sheath can be taken as the base interpolation points to obtain the base interpolation point $\rho_k$, where k=1, ..., r, and r represents a quantity of interpolation data points required by the interpolation method. For all values of k, on a concerned power cable or a power cable that is of the same type and batch and provided by the supplier, multipoint measurement is performed on Z-direction coordinates inside different corrugations at a position of the base interpolation point $\rho_k$ in these corrugations, and an average value of measured coordinates is taken to obtain the coordinates $(\rho_K, 0, z_k)$ of the interpolation data point. Therefore, it can be obtained that an interpolation function of an approximate curved surface $$\begin{cases} 0 \le \rho \\ 0 \le \theta \le \pi \\ 0 \le z \end{cases}$$

in the range indicated by $0 \le \theta_P \le \theta_A$ includes a first interpolation function $f(p)$ and a second interpolation function $f^{-1}(z)$.

The radial resistance value $R_H$ is closely related to a function of an inner curved surface of the corrugated sheath, and the inner curved surface is denoted as $z=f(\rho,\theta)$, where it is difficult to obtain an analytical expression of $f(\rho,\theta)$. However, a corresponding result can be approximately calculated by a continuously differentiable approximation function of the curved surface $z=f(\rho,\theta)$. As shown in FIG. 6, $\Omega_{\rho\theta}$ is denoted as a projection of the contact surface on the plane with z=0, and coordinates of any point $P \in \Omega_{\rho\theta}$ are denoted as $(\rho_P, \theta_P, 0)$. In a longitudinal direction of the power cable, an approximate curved surface $z=f(\rho)$ of the contact surface between the corrugated sheath and the semi-conducting bedding layer (hereinafter referred to as an approximate curved surface) can be obtained by approximating a corrugation curve EDF.

Specifically, in step S5, the calculating volume resistivity of the semi-conducting bedding layer based on the radial resistance value and the contact angle includes the following steps S51 and S52:

S51: Calculate first volume resistivity of the semi-conducting bedding layer in a resistance approximation mode based on the interpolation function, the radial resistance value, and the contact angle.

S52: Calculate second volume resistivity of the semi-conducting bedding layer in a conductance approximation mode based on the interpolation function, the radial resistance value, and the contact angle.

For example, as shown in FIG. 6, based on coordinates of a p-O plane, a three-dimensional coordinate system can be established by the longitudinal direction of the power cable as a Z direction. The contact surface between the semi-conducting bedding layer and the corrugated sheath is indicated by dotted lines. To accurately calculate the volume resistivity of the semi-conducting bedding layer, it is necessary to obtain a current direction at each point on a current path between the corrugated sheath and the shield, and a calculation cost in such a way is unacceptable. Therefore, the following assumption is made in this embodiment of the present disclosure to simplify the calculation.

It is assumed that when a DC voltage is applied between the corrugated sheath and the shield, a current path reaches the shield after passing through the semi-conducting bedding layer in a form of an inward radiative ray with the position O of the center of the circle of the corrugated sheath as a center of a circle at a corrugated sheath end. Due to use of a polar coordinate system, cross sections at both ends of a current path are different. FIG. 6 is a schematic diagram of a current path (indicated by a black square in FIG. 6). A formula for calculating resistance based on resistivity is corrected in resistance and conductance approximation modes separately. The resistance approximation mode satisfies the following formula:

$$\frac{2}{\delta\left(\frac{L_{min}}{S_{max}} + \frac{L_{max}}{S_{min}}\right)} = \frac{1}{R}$$

The conductance approximation mode satisfies the following formula:

$$\frac{\frac{S_{max}}{L_{min}} + \frac{S_{min}}{L_{max}}}{2\delta} = \frac{1}{R}$$

In the above formulas, $\delta$ represents the volume resistivity; R represents resistance; $L_{max}$ and $L_{min}$ represent maximum and minimum values of a length of the current path respectively; and $S_{max}$ and $S_{min}$ represent maximum and minimum areas of the cross sections at both ends of the current path respectively.

Overall conductance of the semi-conducting bedding layer is a sum of conductance of each path. The conductance of the path can be calculated in the above two approximation modes. As shown in FIG. 6, for an infinitesimal of the semi-conducting bedding layer between the corrugated sheath and the shield at a point $$\begin{cases} \theta = \theta_P, 0 \le \theta_P \le \theta_A \\ z = z_0, 0 \le z_0 \le f(d_{OC}(\theta_P)) \end{cases},$$

$$L_{max} = L_{min} = f^{-1}(z) - d_{OB}, S_{max} = \sqrt{1 + \left(\frac{df^{-1}(z_0)}{dz}\right)^2} f^{-1}(z_0)dzd\theta,$$

and $S_{min} = d_{OB}dzd\theta$. It should be noted that the black square in FIG. 6 represents a path through which a current passes. In the figure, the path should be shown as almost a vertical line. A transverse width of the vertical line is dz, which is a very small value, and lengths in vertical directions on left and right sides can be considered to be approximately equal. Therefore, $L_{max}=L_{min}$ is satisfied.

In the resistance approximation mode, the radial resistance $R_H$ of the semi-conducting bedding layer in the single corrugation pitch satisfies the following formula:

$$\frac{1}{R_H} = \frac{8}{\delta_H} \int_0^{\theta_A} \int_0^{f\left(\sqrt{d_{O'C}^2 - \sin^2\theta d_{OO'}^2} + d_{OO'}\cos\theta\right)}$$

$$\frac{1}{\left(\frac{\left(f^{-1}(z) - \sqrt{d_{O'B}^2 - \sin^2\theta d_{OO'}^2} - d_{OO'}\cos\theta\right)}{\sqrt{1 + \left(\frac{df^{-1}(z)}{dz}\right)^2} f^{-1}(z)} + \frac{\left(f^{-1}(z) - \sqrt{d_{O'B}^2 - \sin^2\theta d_{OO'}^2} - d_{OO'}\cos\theta\right)}{\sqrt{d_{O'B}^2 - \sin^2\theta d_{OO'}^2} + d_{OO'}\cos\theta}\right)} dz d\theta$$

In the conductance approximation mode, the radial resistance $R_H$ of the semi-conducting bedding layer in the single corrugation pitch satisfies the following formula:

$$\frac{1}{R_H} = \frac{2}{\delta_H} \int_0^{\theta_A} \int_0^{f\left(\sqrt{d_{O'C}^2 - \sin^2\theta d_{OO'}^2} + d_{OO'}\cos\theta\right)} \frac{\sqrt{1 + \left(\frac{df^{-1}(z)}{dz}\right)^2} f^{-1}(z) + \sqrt{d_{O'B}^2 - \sin^2\theta d_{OO'}^2} + d_{OO'}\cos\theta}{f^{-1}(z) - \sqrt{d_{O'B}^2 - \sin^2\theta d_{OO'}^2} - d_{OO'}\cos\theta} dz d\theta$$

After a specific interpolation function is determined, a double integral of the volume resistivity of the semi-conducting bedding layer can be simplified. It can be found that an analytical solution cannot be guaranteed for the integrals before and after simplification, and the integrals can be obtained by a numerical integration method. The integrals can be obtained by the numerical integration method such as a trapezoidal method, a Simpson's Rule, a Newton Cotes formula, a Romberg method, a Gaussian integration method, a Chebyshev integration method, or a Monte Carlo integration method, and their improved forms. In order to avoid a singularity in the integral, it is necessary to perform numerical approximation on an upper integral limit, for example, set a correction value & of the upper integral limit to $10^{-10}$, so as to obtain an approximate value of the volume resistivity of the semi-conducting bedding layer in the single corrugation pitch according to the above two formulas, and then obtain an approximate value of the volume resistivity of the semi-conducting bedding layer of the whole power cable.

In step S51, the calculating first volume resistivity of the semi-conducting bedding layer in a resistance approximation mode based on the interpolation function, the radial resistance value, and the contact angle satisfies the following formula:

$$\delta_{HR} = 8R_H \int_0^{\theta_A} \int_0^{f\left(\sqrt{d_{O'C}^2 - \sin^2\theta d_{OO'}^2} + d_{OO'}\cos\theta\right) - \varepsilon}$$

$$\frac{1}{\left(\frac{1}{\sqrt{1 + \left(\frac{df^{-1}(z)}{dz}\right)^2} f^{-1}(z)} + \frac{1}{\sqrt{d_{O'B}^2 - \sin^2\theta d_{OO'}^2} + d_{OO'}\cos\theta}\right)}$$

where $\delta_{HR}$ represents the first volume resistivity; $R_H$ represents the radial resistance value; OA represents the contact angle; $d_{O'C}$ represents the first outer radius of the power cable containing the semi-conducting bedding layer; $d_{O'B}$ represents the second outer radius of the power cable containing the shield; $d_{OO'}$ represents the distance between the center of the circle of the corrugated sheath and the center of the circle of the power cable conductor; $\varepsilon$ represents the correction value of the upper integral limit, which is a constant, for example, $\varepsilon=10^{-10}$; $f(\rho)$ represents the first interpolation function, and $\rho = \sqrt{d_{o'c}^2 - \sin^2\theta d_{oo'}^2} + d_{oo'}\cos\theta$; and $f^{-1}(z)$ represents the second interpolation function.

In step S52, the calculating second volume resistivity of the semi-conducting bedding layer in a conductance approximation mode based on the interpolation function, the radial resistance value, and the contact angle satisfies the following formula:

$$\delta_{HC} = 2R_H \int_0^{\theta_A} \int_0^{f\left(\sqrt{d_{O'C}^2 - \sin^2\theta d_{OO'}^2} + d_{OO'}\cos\theta\right) - \varepsilon}$$

$$\frac{\sqrt{1 + \left(\frac{df^{-1}(z)}{dz}\right)^2} f^{-1}(z) + \sqrt{d_{O'B}^2 - \sin^2\theta d_{OO'}^2} + d_{OO'}\cos\theta}{f^{-1}(z) - \sqrt{d_{O'B}^2 - \sin^2\theta d_{OO'}^2} - d_{OO'}\cos\theta} dz d\theta$$

where $\delta_{HC}$ represents the second volume resistivity; $R_H$ represents the radial resistance value; $\theta_A$ represents the contact angle; $d_{O'C}$ represents the first outer radius of the power cable containing the semi-conducting bedding layer; $d_{O'B}$ represents the second outer radius of the power cable containing the shield; $d_{OO'}$ represents the distance between the center of the circle of the corrugated sheath and the center of the circle of the power cable conductor; $\varepsilon$ represents the correction value of the upper integral limit, which is a constant, for example, $\varepsilon=10^{-10}$; $f(\rho)$ represents the first interpolation function, and $\rho = \sqrt{d_{o'c}^2 - \sin^2\theta d_{oo'}^2} + d_{oo'}\cos\theta$; and $f^{-1}(z)$ represents the second interpolation function.

Specifically, in step S6, the comparing the volume resistivity with a preset evaluation parameter to obtain a defect detection result of the semi-conducting bedding layer includes the following steps S61 to S63:

S61: Determine total volume resistivity of the semi-conducting bedding layer based on the first volume resistivity and the second volume resistivity.

S62: When the total volume resistivity is less than or equal to the evaluation parameter, determine that there is no defect in the semi-conducting bedding layer.

S63: When the total volume resistivity is greater than the evaluation parameter, determine that there is a defect in the semi-conducting bedding layer.

Optionally, the total volume resistivity of the semi-conducting bedding layer determined based on the first volume resistivity and the second volume resistivity satisfies the following formula:

$$\delta_H = w\delta_{HR} + (1-w)\delta_{HC}$$

where $\delta_H$ represents the total volume resistivity; w represents a weight coefficient, and $w \in [0, 1]$; $\delta_{HR}$ represents the first volume resistivity; and $\delta_{HC}$ represents the second volume resistivity.

For example, the total volume resistivity is calculated by setting the weight coefficient w. For example, when w is 0, the total volume resistivity $\delta_H$ is equal to the second volume resistivity $\delta_{HC}$; when w is 1, the total volume resistivity $\delta_H$ is equal to the first volume resistivity $\delta_{HR}$; when w is 0.5, the total volume resistivity $\delta_H$ is equal to a sum of half of the first volume resistivity $\delta_{HR}$ and half of the second volume resistivity $\delta_{HC}$.

At present, as required in JB/T 10259-2014, the volume resistivity of the semi-conducting bedding layer needs to be less than or equal to 1000 Ω·m (evaluation parameter). Therefore, when $\delta_H$ is less than or equal to 1000 Ω·m, it is determined that there is no defect in the semi-conducting bedding layer; when $\delta_H$ is greater than 1000 Ω·m, it is determined that there is a defect in the semi-conducting bedding layer.

The above steps S1 to S6 are described with specific embodiments.

Embodiment 1

Parameter setting is performed for a nonlinear equation solving method. If $g(x) < 10^{-13}$, x is regarded as a solution of $g(x)=0$. A cubic polynomial interpolation manner is selected. Parameter setting is performed for a numerical integration method. A correction value ε of an upper integral limit is set to $10^{-10}$. A second resistance value $R_P$ is calculated through actual measurement. A weight coefficient w in a formula of calculating total volume resistivity is set to 0. In this case, $\delta_H = \delta_{HC}$.

S1: Sort a production test report or an actually measured result of a power cable to obtain the following data: a nominal value of a length parameter $d_{cable}$ of the power cable, a nominal value of an inner radius $d_{OA}$ of a corrugated sheath, a nominal value of a first outer radius $d_{O'C}$ containing a semi-conducting bedding layer, a nominal value of a second outer radius $d_{O'B}$ containing an insulation shield, a nominal value of a corrugation pitch parameter $d_{len}$, a nominal value of a corrugation depth $d_{dep}$, and a thickness parameter $d_{BB'}$ of a thinnest point of the semi-conducting bedding layer. The sorted data is shown in Table 1.

TABLE 1

| Size parameters of the power cable | | | | | | | |
|---|---|---|---|---|---|---|---|
| Variable | $d_{cable}$ | $d_{OA}$ | $d_{O'C}$ | $d_{O'B}$ | $d_{len}$ | $d_{dep}$ | $d_{BB'}$ |
| Value (m) | 102 | 0.0650 | 0.0630 | 0.0590 | 0.032 | 0.0062 | 0.0018 |

S2: Perform measurement to obtain a first resistance value $R_S$. A second resistance value $2nR_P$ is calculated by actually measured values (the first implementation in the above steps S221 to S224). In this case, the second resistance value $R_P$ of the shield is calculated according to $$n = \left[\frac{d_{cable}}{d_{len}}\right].$$

Sorted data is shown in Table 2.

TABLE 2

| Resistance parameters | | | | |
|---|---|---|---|---|
| Variable | $R_S$ (Ω) | $2nR_P$ (kΩ) | n | $R_P$ (Ω) |
| Value | 71 | 13.2 | 3187 | 2.0709 |

S3: Solve the following equation by taking $$\tilde{R}_H = \frac{R_S^2}{R_P} - R_S$$

as an initial point and using the nonlinear equation solving method:

$$g(R_H) = R_n(R_H) - R_S = 0$$

The following recursive formulas are used for calculation:

$$R_1 = R_H + R_P$$

$$R_2 = \frac{R_1 R_H}{(R_1 + R_H)} + R_P$$

$$\cdots$$

$$R_n = \frac{R_{n-1} R_H}{(R_{n-1} + R_H)} + R_P$$

$\tilde{R}_H = 2363.1920$ is substituted into the corresponding equation to obtain $g(\tilde{R}_H) = 1.2790 \times 10^{-12} > 10^{-13}$, a nonlinear equation is solved by a Newton method, and one iteration is performed to obtain a final resolution $R_H$, namely, 2363.1920. It can be seen that the initial point of $R_H$ is very close to the final solution.

A base interpolation point $\rho_k$ is obtained. For all values of k, on a concerned power cable or a power cable that is of the same type and batch and provided by a supplier, multipoint measurement is performed on Z-direction coordinates inside different corrugations at a position of the base interpolation point $\rho_k$ in these corrugations, and an average value of measured coordinates is taken to obtain coordinates $(\rho_k, 0, z_k)$ of an interpolation data point. Coordinates of the interpolation data point after measurement are shown in Table 3.

TABLE 3

| Coordinates of the interpolation data point | | | |
|---|---|---|---|
| Interpolation data point 1 | Interpolation data point 2 | Interpolation data point 3 | Interpolation data point 4 |
| (0.0650, 0, 0) | (0.0671, 0, 0.0060) | (0.0691, 0, 0.0089) | (0.0712, 0, 0.0160) |

Interpolation functions $f(\rho)$ and $f^{-1}(z)$ are obtained through interpolation calculation based on the interpolation data point $(\rho_k, 0, z_k)$, where $k=1, \ldots, r$. A parameter result of a cubic calculation polynomial interpolation equation $f(\rho)=T_3\rho^3+T_2\rho^2+T_1\rho+T_0$ is shown in Table 4.

TABLE 4

Parameter value of a first interpolation function

| $T_3$ | $T_2$ | $T_1$ | $T_0$ |
|---|---|---|---|
| $1.3784 \times 10^5$ | $-2.8095 \times 10^4$ | $1.9102 \times 10^3$ | $-43.3109$ |

A parameter calculation result of a cubic polynomial interpolation equation $f^{-1}(z)=U_3z^3+U_2z^2+U_1z+U_0$ is shown in Table 5.

TABLE 5

Parameter value of a second interpolation function

| $U_3$ | $U_2$ | $U_1$ | $U_0$ |
|---|---|---|---|
| $-5.2204 \times 10^3$ | $119.1553$ | $-0.1826$ | $0.0650$ |

S4: Perform calculation according to $d_{OO}=d_{OA}-d_{O'B}-d_{BB'}$, obtain a distance $d_{OO'}$ between a center of a circle of the corrugated sheath and a center of a circle of a power cable conductor, namely, 4.2 mm; and when there is no contact between the corrugated sheath and the semi-conducting bedding layer above the power cable, perform calculation to obtain an angle $\theta_A$ of a critical point of contact between the corrugated sheath and the semi-conducting bedding layer, namely, 59.9199.

S5: Perform calculation based on the above parameters to obtain $\delta_{HR}$, namely, $1.1270\times10^3$ $\Omega\cdot$m, and $\delta_{HC}$, namely, $1.1309\times10^3$ $\Omega\cdot$m.

S6: Based on $\delta_H=\delta_{HC}=1.1309\times10^3>1.0\times10^3$ $\Omega\cdot$m, determine that volume resistivity of the semi-conducting bedding layer in the power cable is unqualified, and that the semi-conducting bedding layer has a potential ablation risk.

Embodiment 2

Parameter setting is performed for a nonlinear equation solving method. If $g(x)<10^{-13}$, x is regarded as a solution of $g(x)=0$. A cubic polynomial interpolation manner is selected. Parameter setting is performed for a numerical integration method. A correction value $\varepsilon$ of an upper integral limit is set to $10^{-10}$. A second resistance value $R_P$ is calculated through resistivity calculation. A weight coefficient w in a formula of calculating total volume resistivity is set to 0.5. In this case, $\delta_H=0.5\delta_{HR}+0.5\delta_{HC}$.

S1: Sort a production test report or a measured result of a power cable to obtain the following data: a nominal value of a length parameter $d_{cable}$ of the power cable, a nominal value of an inner radius $d_{OA}$ of a corrugated sheath, a nominal value of a first outer radius $d_{O'C}$ containing a semi-conducting bedding layer, a nominal value of a second outer radius $d_{O'B}$ containing an insulation shield, a nominal value of a corrugation pitch parameter $d_{len}$, a nominal value of a corrugation depth $d_{dep}$, a thickness parameter $d_{BB'}$ of a thinnest point of the semi-conducting bedding layer, a nominal value of volume resistivity $\delta_P$ of the shield, and a nominal value of a thickness $t_P$ of the insulation shield. The sorted data is shown in Table 1.

TABLE 1

Size parameters of the power cable

| Variable | $d_{cable}$ | $d_{OA}$ | $d_{O'C}$ | $d_{O'B}$ | $d_{len}$ | $d_{dep}$ | $d_{BB'}$ | $t_P$ |
|---|---|---|---|---|---|---|---|---|
| Value (m) | 499 | 0.0606 | 0.0598 | 0.0550 | 0.0280 | 0.0064 | 0.0021 | 0.0015 |

$\delta_P=0.06$ $\Omega\cdot$m.

S2: Perform measurement to obtain a first resistance value $R_S$, and calculate resistance $2nR_P$ of the insulation shield of the whole power cable according to a resistivity formula $$2nR_P = \frac{\delta_P d_{cable}}{\pi(d_{O'B}^2 - (d_{O'B}-t_P)^2)}$$

(the second implementation of the above steps S231 to S232), to calculate $R_P$, where $$n = \left\lfloor \frac{d_{cable}}{d_{len}} \right\rfloor.$$

Sorted data is shown in Table 2.

TABLE 2

Resistance parameters

| Variable | $R_S$ ($\Omega$) | $2nR_P$ (k$\Omega$) | n | $R_P$ ($\Omega$) |
|---|---|---|---|---|
| Value | 34 | 58.5573 | 17821 | 1.6429 |

S3: Solve the following equation by taking $$\tilde{R}_H = \frac{R_S^2}{R_P} - R_S$$

as an initial point and using the nonlinear equation solving method:

$g(R_H)=R_n(R_H)-R_S=0$

The following recursive formulas are used for calculation:

$$R_1 = R_H + R_P$$

$$R_2 = \frac{R_1 R_H}{(R_1 + R_H)} + R_P$$

-continued $$R_n = \frac{R_{n-1} R_H}{(R_{n-1} + R_H)} + R_P$$

$\tilde{R}_H$=669.6213 is substituted into the corresponding equation to obtain $g(\tilde{R}_H)$=4.2633×10$^{-14}$<10$^{-13}$. Then a final solution $R_H$, namely, 669.6213, is obtained.

A base interpolation point $\rho_k$ is obtained. For all values of k, on a concerned power cable or a power cable that is of the same type and batch and provided by a supplier, multipoint measurement is performed on Z-direction coordinates inside different corrugations at a position of the base interpolation point $\rho_k$ in these corrugations, and an average value of measured coordinates is taken to obtain coordinates $(\rho_k, 0, z_k)$ of an interpolation data point. Coordinates of the interpolation data point after measurement are shown in Table 3.

TABLE 3

| Coordinates of the interpolation data point | | | |
|---|---|---|---|
| Interpolation data point 1 | Interpolation data point 2 | Interpolation data point 3 | Interpolation data point 4 |
| (0.0606, 0, 0) | (0.0627, 0, 0.0061) | (0.0649, 0, 0.0089) | (0.0670, 0, 0.0140) |

Interpolation functions $f(\rho)$ and $f^{-1}(z)$ are obtained through interpolation calculation based on the interpolation data point $(\rho_k, 0, z_k)$, where k=1, . . . , r. A parameter calculation result of a cubic polynomial interpolation equation $f(\rho)=T_3\rho^3+T_2\rho^2+T_1\rho+T_0$ is shown in Table 4.

TABLE 4

| Parameter value of a first interpolation function | | | |
|---|---|---|---|
| $T_3$ | $T_2$ | $T_1$ | $T_0$ |
| 9.6130 × 10$^4$ | −1.8454 × 10$^4$ | 1.1821 × 10$^3$ | −25.2573 |

A parameter calculation result of a cubic polynomial interpolation equation $f^{-1}(z)=U_3z^3+U_2z^2+U_1z+U_0$ is shown in Table 5.

TABLE 5

| Parameter value of a second interpolation function | | | |
|---|---|---|---|
| $U_3$ | $U_2$ | $U_1$ | $U_0$ |
| −6.4147 × 10$^3$ | 142.5332 | −0.2810 | 0.0606 |

S4: Perform calculation according to $d_{OO'}=d_{OA}-d_{O'B}-d_{BB'}$. Am obtain a distance $d_{OO'}$ between a center of a circle of the corrugated sheath and a center of a circle of a power cable conductor, namely, 3.45 mm; and when there is no contact between the corrugated sheath and the semi-conducting bedding layer above the power cable, perform calculation to obtain an angle $\theta_A$ of a critical point of contact between the corrugated sheath and the semi-conducting bedding layer, namely, 75.1721.

S5: Perform calculation based on the above parameters to obtain $\delta_{HR}$, namely, 354.2845 Ω·m, and $\delta_{HC}$, namely, 356.2548 Ω·m.

S6: Take $\delta_H=0.5\delta_{HR}+0.5\delta_{HC}$ as a measurement result of volume resistivity of the semi-conducting bedding layer; and based on H=$0.5\delta_{HR}+0.5\delta_{HC}$=355.2697<1.0×10$^3$ Ω·m, determine that the volume resistivity of the semi-conducting bedding layer in the power cable is qualified, and that the semi-conducting bedding layer has no potential ablation risk.

Compared with the prior art, the defect detection method for a semi-conducting bedding layer of a power cable disclosed in this embodiment of the present disclosure obtains size information of the power cable and determines the contact angle of the critical point of contact between the semi-conducting bedding layer and the corrugated sheath based on the size information; calculates the radial resistance value of the semi-conducting bedding layer in the single corrugation pitch based on a DC resistance measurement result of a single port of a finished high-voltage power cable; and finally calculates the volume resistivity of the semi-conducting bedding layer based on the radial resistance value and the contact angle, and obtains the defect detection result of the semi-conducting bedding layer based on a comparison result of the evaluation parameter and the volume resistivity of the semi-conducting bedding layer. The defect detection method for a semi-conducting bedding layer of a power cable disclosed in this embodiment of the present disclosure can accurately calculate the volume resistivity of the semi-conducting bedding layer of the power cable, so as to accurately determine, based on the volume resistivity, whether there is a potential ablation risk in the semi-conducting bedding layer of the power cable.

Figure 9:
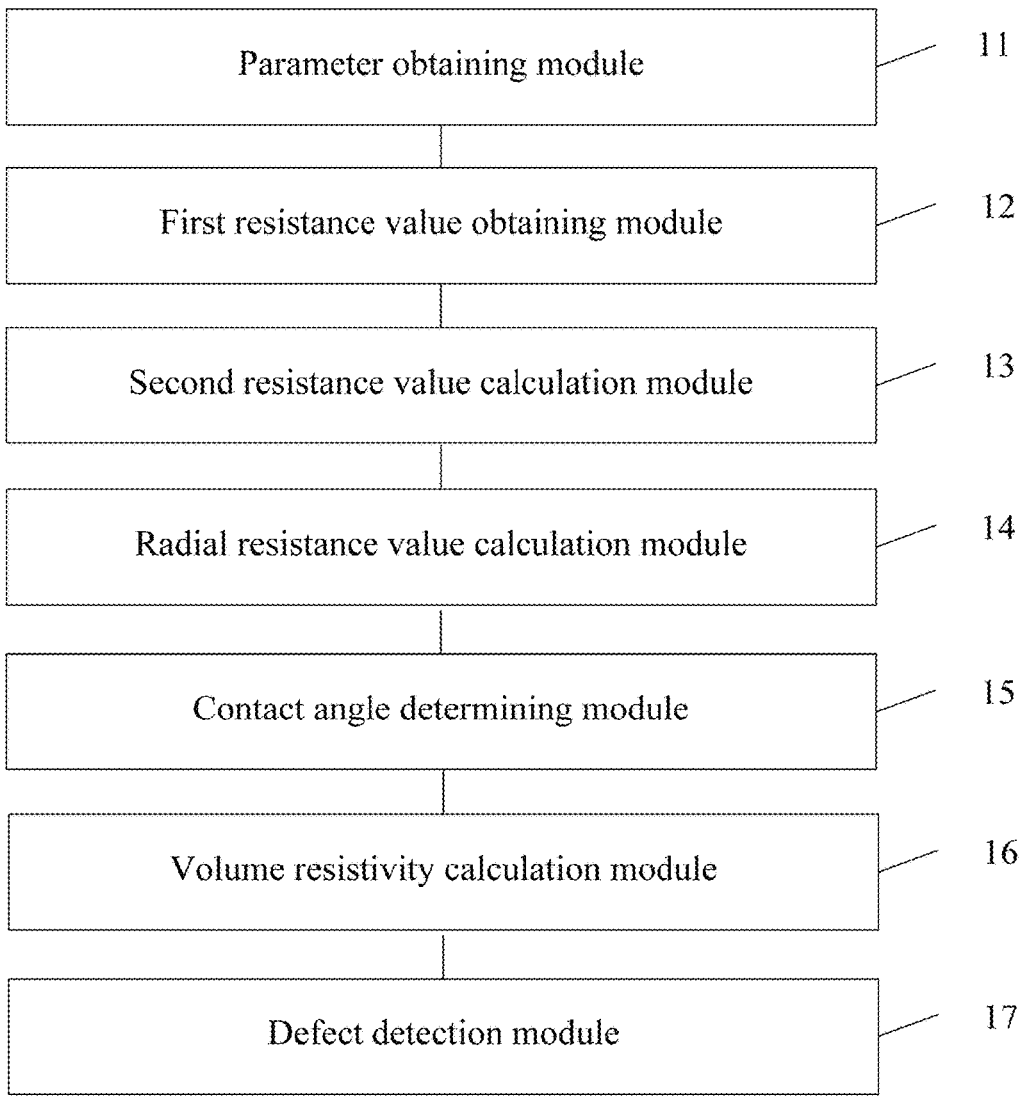
FIG. 9 is a structural block diagram of a defect detection apparatus for a semi-conducting bedding layer of a power cable according to an embodiment of the present disclosure.

FIG. 9 is a structural block diagram of a defect detection apparatus 50 for a semi-conducting bedding layer of a power cable according to an embodiment of the present disclosure. The defect detection apparatus 50 for a semi-conducting bedding layer of a power cable includes:

a parameter obtaining module 11, configured to obtain a length parameter, a corrugation pitch parameter, radius parameters, and a thickness parameter of a power cable;

a first resistance value obtaining module 12, configured to obtain a first resistance value between a shield and a corrugated sheath;

a second resistance value calculation module 13, configured to calculate a second resistance value of the shield based on the length parameter and the corrugation pitch parameter;

a radial resistance value calculation module 14, configured to calculate a radial resistance value of a semi-conducting bedding layer based on the first resistance value and the second resistance value;

a contact angle determining module 15, configured to determine a contact angle of a critical point of contact between the corrugated sheath and the semi-conducting bedding layer based on the radius parameters and the thickness parameter;

a volume resistivity calculation module 16, configured to calculate volume resistivity of the semi-conducting bedding layer based on the radial resistance value and the contact angle; and a defect detection module 17, configured to compare the volume resistivity with a preset evaluation parameter to obtain a defect detection result of the semi-conducting bedding layer.

Optionally, the defect detection apparatus 50 for a semi-conducting bedding layer of a power cable further includes:

an interpolation function obtaining module (not shown in the figure), configured to: take a plurality of points on a contact surface between the semi-conducting bedding layer and the corrugated sheath as base interpolation points; take an average value of the base interpolation points to obtain an interpolation data point; and obtain coordinates of the interpolation data point, and construct an interpolation function based on coordinates of a plurality of interpolation data points.

Optionally, the volume resistivity calculation module 16 is configured to:

calculate first volume resistivity of the semi-conducting bedding layer in a resistance approximation mode based on the interpolation function, the radial resistance value, and the contact angle; and calculate second volume resistivity of the semi-conducting bedding layer in a conductance approximation mode based on the interpolation function, the radial resistance value, and the contact angle.

Optionally, the first volume resistivity satisfies the following formula:

$$\delta_{HR} = 8R_H \int_0^{\theta_A} \int_0^{f\left(\sqrt{d^2_{O'C} - \sin^2\theta d^2_{OO'}} + d_{OO'}\cos\theta\right) - \varepsilon} \frac{1}{\left(\sqrt{1 + \left(\frac{df^{-1}(z)}{dz}\right)^2} f^{-1}(z)\right) + \frac{1}{\sqrt{d^2_{O'B} - \sin^2\theta d^2_{OO'}} + d_{OO'}\cos\theta}}$$

where $\delta_{HR}$ represents the first volume resistivity; $R_H$ represents the radial resistance value; $\theta_A$ represents the contact angle; $d_{O'C}$ represents a first outer radius of the power cable containing the semi-conducting bedding layer; $d_{O'B}$ represents a second outer radius of the power cable containing the shield; $d_{OO'}$ represents a distance between a center of a circle of the corrugated sheath and a center of a circle of a power cable conductor; $\varepsilon$ represents a correction value of an upper integral limit, which is a constant; $f(\rho)$ represents a first interpolation function, and $\rho = d_{o'c}^2 - \sin^2\theta d_{oo'}^2 + d_{oo'}\cos\theta$; and $f^{-1}(z)$ represents s a second interpolation function.

Optionally, the second volume resistivity satisfies the following formula:

$$\delta_{HC} = 2R_H \int_0^{\theta_A} \int_0^{f\left(\sqrt{d^2_{O'C} - \sin^2\theta d^2_{OO'}} + d_{OO'}\cos\theta\right) - \varepsilon} \frac{\sqrt{1 + \left(\frac{df^{-1}(z)}{dz}\right)^2} f^{-1}(z) + \sqrt{d^2_{O'B} - \sin^2\theta d^2_{OO'}} + d_{OO'}\cos\theta}{f^{-1}(z) - \sqrt{d^2_{O'B} - \sin^2\theta d^2_{OO'}} - d_{OO'}\cos\theta} dz d\theta$$

where $\delta_{HC}$ represents the second volume resistivity; $R_H$ represents the radial resistance value; $\theta_A$ represents the contact angle; $d_{O'C}$ represents a first outer radius of the power cable containing the semi-conducting bedding layer; $d_{O'B}$ represents a second outer radius of the power cable containing the shield; $d_{OO'}$ represents a distance between a center of a circle of the corrugated sheath and a center of a circle of a power cable conductor; $\zeta$ represents a correction value of an upper integral limit, which is a constant; $f(\rho)$ represents a first interpolation function, and $\rho = \sqrt{d_{o'c}^2 - \sin^2\theta d_{oo'}^2} + d_{oo'}\cos\theta$; and $f^{-1}(z)$ represents a second interpolation function.

The defect detection module 17 is configured to:

determine total volume resistivity of the semi-conducting bedding layer based on the first volume resistivity and the second volume resistivity; and when the total volume resistivity is less than or equal to the evaluation parameter, determine that there is no defect in the semi-conducting bedding layer; or when the total volume resistivity is greater than the evaluation parameter, determine that there is a defect in the semi-conducting bedding layer.

Optionally, the total volume resistivity of the semi-conducting bedding layer determined based on the first volume resistivity and the second volume resistivity satisfies the following formula:

$$\delta_H = w\delta_{HR} + (1-w)\delta_{HC}$$

where $\delta_H$ represents the total volume resistivity; w represents a weight coefficient, and $w \in [0, 1]$; $\delta_{HR}$ represents the first volume resistivity; and $\delta_{HC}$ represents the second volume resistivity.

Optionally, the radius parameters include an inner radius of the corrugated sheath, a first outer radius of the power cable containing the semi-conducting bedding layer, and a second outer radius of the power cable containing the shield, and the thickness parameter is a minimum value of a thickness of the semi-conducting bedding layer; and the contact angle determining module 15 is configured to:

calculate a sum of the thickness parameter, the first outer radius, and the second outer radius; and when the sum of the thickness parameter, the first outer radius, and the second outer radius is greater than a preset parameter threshold, determine that the contact angle of the critical point of contact between the corrugated sheath and the semi-conducting bedding layer is x, where the parameter threshold is a multiple of the inner radius; or when the sum of the thickness parameter, the first outer radius, and the second outer radius is less than or equal to a preset parameter threshold, calculate a distance between a center of a circle of the corrugated sheath and a center of a circle of a power cable conductor based on the inner radius, the thickness parameter, and the second outer radius; and calculate the contact angle of the critical point of contact between the corrugated sheath and the semi-conducting bedding layer based on the distance between the center of the circle of the corrugated sheath and the center of the circle of the power cable conductor, the inner radius, and the first outer radius, where the contact angle satisfies the following formula:

$$\theta_A = \arccos\left(\frac{d^2_{OO'} + d^2_{OA} - d^2_{O'C}}{2 d_{OO'} d_{OA}}\right)$$

where $\theta_A$ represents the contact angle; $d_{OO'}$ represents the distance between the center of the circle of the corrugated sheath and the center of the circle of the power cable conductor; $d_{OA}$ represents the inner radius; and $d_{O'C}$ represents the first outer radius.

Optionally, the first resistance value obtaining module 12 is configured to:

connect a conductor mesh belt to the corrugated sheath and the shield at a first end of the power cable separately, and connect the two conductor mesh belts to two terminals of a direct current (DC) resistance tester respectively for resistance measurement to obtain a plurality of first measured values;

connect a conductor mesh belt to the corrugated sheath and the shield at a second end of the power cable separately, and connect the two conductor mesh belts to the two terminals of the DC resistance tester respectively for resistance measurement to obtain a plurality of second measured values; and take an average value of the first measured values and the second measured values as the first resistance value.

Optionally, the second resistance value calculation module 13 configured to:

connect a conductor mesh belt to the shield and a power cable conductor at each end of the power cable separately;

connect conductor mesh belts of the shield and the power cable conductor at a first end of the power cable together, and connect conductor mesh belts of the shield and the power cable conductor at a second end of the power cable to two terminals of a DC resistance tester respectively for resistance measurement to obtain a plurality of third measured values;

connect the conductor mesh belts of the shield and the power cable conductor at the second end of the power cable together, and connect the conductor mesh belts of the shield and the power cable conductor at the first end of the power cable to the two terminals of the DC resistance tester respectively for resistance measurement to obtain a plurality of fourth measured values; and calculate the second resistance value based on an average value of the third measured values and the fourth measured values, the length parameter, and the corrugation pitch parameter.

Optionally, the second resistance value calculation module 13 further configured to:

obtain volume resistivity and a thickness of the shield; and calculate the second resistance value based on the length parameter, the corrugation pitch parameter, a second outer radius of the power cable containing the shield, and the volume resistivity and the thickness of the shield, where the second resistance value satisfies the following formula:

$$2nR_P = \frac{\delta_P d_{cable}}{\pi(d_{O'B}^2 - (d_{O'B} - t_P)^2)}$$

where $R_P$ represents the second resistance value; n represents a quantity of corrugations, and $$n = \left\lfloor \frac{d_{cable}}{d_{len}} \right\rfloor \text{ or } n = \left\lceil \frac{d_{cable}}{d_{len}} \right\rceil;$$

$d_{cable}$ represents the length parameter; $d_{len}$ represents the corrugation pitch parameter; $d_{O'B}$ represents the second outer radius of the power cable containing the shield; $\delta_P$ represents the volume resistivity of the shield; and $t_P$ represents the thickness of the shield.

Optionally, the radial resistance value calculation module 14 is configured to:

construct an initial equation of a preset radial resistance value based on the first resistance value and the second resistance value;

construct a solving equation of the radial resistance value based on the first resistance value; and calculate the radial resistance value based on the initial equation and the solving equation.

It should be noted that for a working process of each module in the defect detection apparatus 50 for a semi-conducting bedding layer of a power cable in this embodiment of the present disclosure, reference may be made to the working process of the defect detection method for a semi-conducting bedding layer of a power cable in the above embodiment, and details are not described herein again.

In another embodiment, the defect detection apparatus 50 for a semi-conducting bedding layer of a power cable includes: a processor, where the processor is configured to execute the above program modules stored in a memory, including the parameter obtaining module 11, the first resistance value obtaining module 12, the second resistance value calculation module 13, the radial resistance value calculation module 14, the contact angle determining module 15, the volume resistivity calculation module 16, and the defect detection module 17.

Compared with the prior art, the defect detection apparatus 50 for a semi-conducting bedding layer of a power cable disclosed in this embodiment of the present disclosure obtains size information of the power cable and determines the contact angle of the critical point of contact between the semi-conducting bedding layer and the corrugated sheath based on the size information; calculates the radial resistance value of the semi-conducting bedding layer in a single corrugation pitch based on a DC resistance measurement result of a single port of a finished high-voltage power cable; and finally calculates the volume resistivity of the semi-conducting bedding layer based on the radial resistance value and the contact angle, and obtains the defect detection result of the semi-conducting bedding layer based on a comparison result of the evaluation parameter and the volume resistivity of the semi-conducting bedding layer. The defect detection apparatus for a semi-conducting bedding layer of a power cable disclosed in this embodiment of the present disclosure can accurately calculate the volume resistivity of the semi-conducting bedding layer of the power cable, so as to accurately determine, based on the volume resistivity, whether there is a potential ablation risk in the semi-conducting bedding layer of the power cable.

Figure 10:
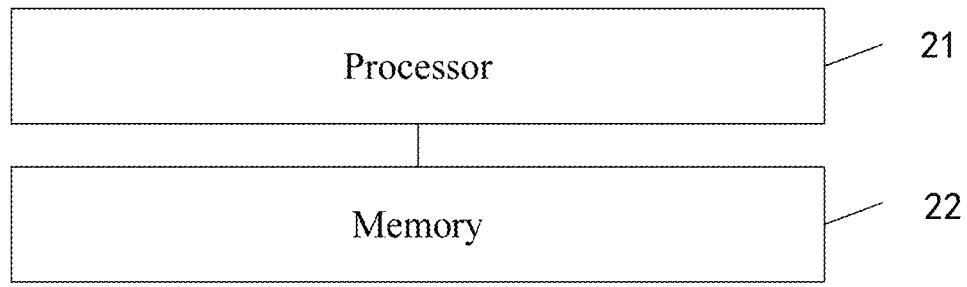
FIG. 10 is a structural block diagram of a defect detection device for a semi-conducting bedding layer of a power cable according to an embodiment of the present disclosure.

FIG. 10 is a structural block diagram of a defect detection device 60 for a semi-conducting bedding layer of a power cable according to an embodiment of the present disclosure. The defect detection device 60 for a semi-conducting bedding layer of a power cable includes a processor 21, a memory 22, and a computer program stored in the memory 22 and executable on the processor 21, where the processor 21 executes the computer program to implement the steps in each above embodiment of the defect detection method for a semi-conducting bedding layer of a power cable, for example, steps S1 to S6 in FIG. 1.

S1: Obtain a length parameter, a corrugation pitch parameter, radius parameters, and a thickness parameter of a power cable, where the power cable includes a shield, a corrugated sheath, and a semi-conducting bedding layer between the shield and the corrugated sheath.

S2: Obtain a first resistance value between the shield and the corrugated sheath, and calculate a second resistance value of the shield based on the length parameter and the corrugation pitch parameter.

S3: Calculate a radial resistance value of the semi-conducting bedding layer based on the first resistance value and the second resistance value.

S4: Determine a contact angle of a critical point of contact between the corrugated sheath and the semi-conducting bedding layer based on the radius parameters and the thickness parameter.

S5: Calculate volume resistivity of the semi-conducting bedding layer based on the radial resistance value and the contact angle.

S6: Compare the volume resistivity with a preset evaluation parameter to obtain a defect detection result of the semi-conducting bedding layer.

For example, the computer program may be divided into one or more modules/units. The one or more modules/units are stored in the memory 22 and executed by the processor 21 to complete the present disclosure. The one or more modules/units may be a series of computer program instruction segments capable of completing specific functions, and the instruction segments are used for describing an execution process of the computer program in the defect detection device 60 for a semi-conducting bedding layer of a power cable. For example, the computer program may be divided into a parameter obtaining module 11, a first resistance value obtaining module 12, a second resistance value calculation module 13, a radial resistance value calculation module 14, a contact angle determining module 15, a volume resistivity calculation module 16, and a defect detection module 17. A specific function of each module is described as follows:

The parameter obtaining module 11 is configured to obtain the length parameter, the corrugation pitch parameter, the radius parameters, and the thickness parameter of the power cable.

The first resistance value obtaining module 12 is configured to obtain the first resistance value between the shield and the corrugated sheath.

The second resistance value calculation module 13 is configured to calculate the second resistance value of the shield based on the length parameter and the corrugation pitch parameter.

The radial resistance value calculation module 14 is configured to calculate the radial resistance value of the semi-conducting bedding layer based on the first resistance value and the second resistance value.

The contact angle determining module 15 is configured to determine the contact angle of the critical point of contact between the corrugated sheath and the semi-conducting bedding layer based on the radius parameters and the thickness parameter.

The volume resistivity calculation module 16 is configured to calculate the volume resistivity of the semi-conducting bedding layer based on the radial resistance value and the contact angle.

The defect detection module 17 is configured to compare the volume resistivity with the preset evaluation parameter to obtain the defect detection result of the semi-conducting bedding layer.

The defect detection device 60 for a semi-conducting bedding layer of a power cable may be a computing device such as a desktop computer, a notebook computer, a palmtop computer, or a cloud server. The defect detection device 60 for a semi-conducting bedding layer of a power cable may include, but not limited to, the processor 21 and the memory 22. Those skilled in the art can understand that the figure shows only an example of the defect detection device 60 for a semi-conducting bedding layer of a power cable, does not constitute a limitation to the defect detection device 60 for a semi-conducting bedding layer of a power cable, and may include more or less components than those shown in the figure, a combination of some components, or different components. For example, the defect detection device 60 for a semi-conducting bedding layer of a power cable may further include input and output devices, a network access device, a bus, and the like.

The processor 21 may be a central processing unit (CPU), and may also be another general-purpose processor, a digital signal processor (DSP), an application specific integrated circuit (ASIC), a field-programmable gate array (FPGA) or another programmable logic device, a discrete gate, a transistor logic device, a discrete hardware component, or the like. The general-purpose processor may be a microprocessor, or the processor 21 may be any conventional processor. The processor 21 is a control center of the defect detection device 60 for a semi-conducting bedding layer of a power cable, and various parts of the whole defect detection device 60 for a semi-conducting bedding layer of a power cable are connected by various interfaces and lines.

The memory 22 may be configured to store the computer program and/or modules. The processor 21 implements, by running or executing the computer program and/or modules stored in the memory 22 and invoking data stored in the memory 22, various functions of the defect detection device 60 for a semi-conducting bedding layer of a power cable. The memory 22 may mainly include a program storage area and a data storage area. The program storage area may store an operating system, an application program required by at least one function (such as a sound playing function and an image playing function), and the like. The data storage area may store data (such as audio data and an address book) created based on use of a mobile phone, and the like. In addition, the memory 22 may include a high-speed random access memory, and may further include a non-volatile memory, such as a hard disk, an internal storage, a plug-in hard disk, a smart media card (SMC), a secure digital (SD) card, a flash card, at least one magnetic disk storage device, a flash memory device, or another volatile solid-state storage device.

The integrated module/unit of the defect detection device 60 for a semi-conducting bedding layer of a power cable, if implemented in a form of a software functional unit and sold or used as a stand-alone product, may be stored in a computer-readable storage medium. Based on such an understanding, all or some of processes for implementing the method in the foregoing embodiments can be completed by a computer program instructing relevant hardware. The computer program may be stored in a computer-readable storage medium. The computer program is executed by the processor 21 to perform the steps of the foregoing method embodiments. The computer program includes computer program code, and the computer program code may be in a form of source code, a form of object code, an executable file or some intermediate forms, and the like. The computer-readable medium may include: any physical entity or apparatus capable of carrying the computer program code, a recording medium, a USB disk, a mobile hard disk drive, a magnetic disk, an optical disc, a computer memory, a read-only memory (ROM), a random access memory (RAM), an electrical carrier signal, a telecommunications signal, a software distribution medium, and the like.

It should be noted that the apparatus embodiments described above are merely schematic, where the unit described as a separate component may or may not be physically separated, and a component displayed as a unit may or may not be a physical unit, that is, the component may be located at one place, or distributed on a plurality of network units. Some or all of the modules may be selected based on actual needs to achieve the objectives of the solutions of the embodiments. In addition, in the drawings of the apparatus embodiments provided in the present disclosure, a connection relationship between modules represents a communication connection between the modules, which may be specifically implemented as one or more communication buses or signal lines. Those of ordinary skill in the art can understand and implement the present disclosure without creative effort.

The descriptions above are preferred implementations of the present disclosure. It should be noted that for a person of ordinary skill in the art, various improvements and modifications can be made without departing from the principles of the present disclosure. These improvements and modifications should also be regarded as falling into the protection scope of the present disclosure.

The invention claimed is:

1. A defect detection method for a semi-conducting bedding layer of a power cable, comprising:
    obtaining a length parameter, a corrugation pitch parameter, radius parameters, and a thickness parameter of a power cable, wherein the power cable comprises a shield, a corrugated sheath, and a semi-conducting bedding layer between the shield and the corrugated sheath;
    obtaining a first resistance value between the shield and the corrugated sheath, and calculating a second resistance value of the shield based on the length parameter and the corrugation pitch parameter;
    calculating a radial resistance value of the semi-conducting bedding layer based on the first resistance value and the second resistance value;
    determining a contact angle of a critical point of contact between the corrugated sheath and the semi-conducting bedding layer based on the radius parameters and the thickness parameter;
    taking a plurality of points on a contact surface between the semi-conducting bedding layer and the corrugated sheath as base interpolation points;
    taking an average value of the base interpolation points to obtain an interpolation data point;
    obtaining coordinates of the interpolation data point, and constructing an interpolation function based on coordinates of a plurality of interpolation data points;
    calculating first volume resistivity of the semi-conducting bedding layer in a resistance approximation mode based on the interpolation function, the radial resistance value, and the contact angle;
    calculating second volume resistivity of the semi-conducting bedding layer in a conductance approximation mode based on the interpolation function, the radial resistance value, and the contact angle; and
    determining total volume resistivity of the semi-conducting bedding layer based on the first volume resistivity and the second volume resistivity, and comparing the total volume resistivity with a preset evaluation parameter to obtain a defect detection result of the semi-conducting bedding layer.

2. The defect detection method for a semi-conducting bedding layer of a power cable according to claim 1, wherein the first volume resistivity satisfies the following formula:

$$\delta_{HR} = 8R_H \int_0^{\theta_A} \int_0^{f\left(\sqrt{d_{O'C}^2 - \sin^2\theta d_{OO'}^2} + d_{OO'}\cos\theta\right) - \varepsilon} \cfrac{1}{\cfrac{\left(f^{-1}(z) - \sqrt{d_{O'B}^2 - \sin^2\theta d_{OO'}^2} - d_{OO'}\cos\theta\right)}{\left(\cfrac{1}{\sqrt{1+\left(\cfrac{df^{-1}(z)}{dz}\right)^2} f^{-1}(z)} + \cfrac{1}{\sqrt{d_{O'B}^2 - \sin^2\theta d_{OO'}^2} + d_{OO'}\cos\theta}\right)}}$$

wherein $\delta_{HR}$ represents the first volume resistivity; $R_H$ represents the radial resistance value; $\theta_A$ represents the contact angle; $d_{O'C}$ represents a first outer radius of the power cable containing the semi-conducting bedding layer; $d_{O'B}$ represents a second outer radius of the power cable containing the shield; $d_{OO'}$ represents a distance between a center of a circle of the corrugated sheath and a center of a circle of a power cable conductor; $\varepsilon$ represents a correction value of an upper integral limit, which is a constant; $f(\rho)$ represents a first interpolation function, and $\rho = \sqrt{d_{o'c}^2 - \sin^2\theta d_{oo'}^2} + d_{oo'}\cos\theta$; and $f^{-1}(z)$ represents a second interpolation function.

3. The defect detection method for a semi-conducting bedding layer of a power cable according to claim 1, wherein the second volume resistivity satisfies the following formula:

$$\delta_{HC} = 2R_H \int_0^{\theta_A} \int_0^{f\left(\sqrt{d_{O'C}^2 - \sin^2\theta d_{OO'}^2} + d_{OO'}\cos\theta\right) - \varepsilon} \cfrac{\sqrt{1+\left(\cfrac{df^{-1}(z)}{dz}\right)^2} f^{-1}(z) + \sqrt{d_{O'B}^2 - \sin^2\theta d_{OO'}^2} + d_{OO'}\cos\theta}{f^{-1}(z) - \sqrt{d_{O'B}^2 - \sin^2\theta d_{OO'}^2} - d_{OO'}\cos\theta} dz d\theta$$

wherein $\delta_{HC}$ represents the second volume resistivity; $R_H$ represents the radial resistance value; $\theta_A$ represents the contact angle; $d_{O'C}$ represents a first outer radius of the power cable containing the semi-conducting bedding layer; $d_{O'B}$ represents a second outer radius of the power cable containing the shield; $d_{OO'}$ represents a distance between a center of a circle of the corrugated sheath and a center of a circle of a power cable conductor; $\varepsilon$ represents a correction value of an upper integral limit, which is a constant; $f(\rho)$ represents a first interpolation function, and $\rho = d_{o'c}^2 - \sin^2\theta d_{oo'}^2 + d_{oo'}\cos\theta$; and $f^{-1}(z)$ represents a second interpolation function.

4. The defect detection method for a semi-conducting bedding layer of a power cable according to claim 1, wherein the comparing the total volume resistivity with a preset evaluation parameter to obtain a defect detection result of the semi-conducting bedding layer comprises:
    when the total volume resistivity is less than or equal to the evaluation parameter, determining that there is no defect in the semi-conducting bedding layer; or
    when the total volume resistivity is greater than the evaluation parameter, determining that there is a defect in the semi-conducting bedding layer.

5. The defect detection method for a semi-conducting bedding layer of a power cable according to claim 4, wherein the total volume resistivity of the semi-conducting bedding layer determined based on the first volume resistivity and the second volume resistivity satisfies the following formula:

$$\delta_H = w\delta_{HR} + (1-w)\delta_{HC}$$

wherein $\delta_H$ represents the total volume resistivity; w represents a weight coefficient, and w∈[0, 1]; $\delta_{HR}$ represents the first volume resistivity; and $\delta_{HC}$ represents the second volume resistivity.

6. The defect detection method for a semi-conducting bedding layer of a power cable according to claim 1, wherein the radius parameters comprise an inner radius of the corrugated sheath, a first outer radius of the power cable containing the semi-conducting bedding layer, and a second outer radius of the power cable containing the shield, and the thickness parameter is a minimum value of a thickness of the semi-conducting bedding layer; and the determining a contact angle of a critical point of contact between the corrugated sheath and the semi-conducting bedding layer based on the radius parameters and the thickness parameter comprises:
    calculating a sum of the thickness parameter, the first outer radius, and the second outer radius; and
    when the sum of the thickness parameter, the first outer radius, and the second outer radius is greater than a preset parameter threshold, determining that the contact angle of the critical point of contact between the corrugated sheath and the semi-conducting bedding layer is π, wherein the parameter threshold is a multiple of the inner radius.

7. The defect detection method for a semi-conducting bedding layer of a power cable according to claim 6, wherein the determining a contact angle of a critical point of contact between the corrugated sheath and the semi-conducting bedding layer based on the radius parameters and the thickness parameter further comprises:
    when the sum of the thickness parameter, the first outer radius, and the second outer radius is less than or equal to the preset parameter threshold, calculating a distance between a center of a circle of the corrugated sheath and a center of a circle of a power cable conductor based on the inner radius, the thickness parameter, and the second outer radius; and
    calculating the contact angle of the critical point of contact between the corrugated sheath and the semi-conducting bedding layer based on the distance between the center of the circle of the corrugated sheath and the center of the circle of the power cable conductor, the inner radius, and the first outer radius, wherein the contact angle satisfies the following formula:

$$\theta_A = \arccos\left(\frac{d_{OO'}^2 + d_{OA}^2 - d_{O'C}^2}{2d_{OO'}d_{OA}}\right)$$

wherein $\theta_A$ represents the contact angle; $d_{OO'}$ represents the distance between the center of the circle of the corrugated sheath and the center of the circle of the power cable conductor; $d_{OA}$ represents the inner radius; and $d_{O'C}$ represents the first outer radius.

8. The defect detection method for a semi-conducting bedding layer of a power cable according to claim 1, wherein a method for obtaining the first resistance value comprises:
    connecting a conductor mesh belt to the corrugated sheath and the shield at a first end of the power cable separately, and connecting the two conductor mesh belts to two terminals of a direct current (DC) resistance tester respectively for resistance measurement to obtain a plurality of first measured values;
    connecting a conductor mesh belt to the corrugated sheath and the shield at a second end of the power cable separately, and connecting the two conductor mesh belts to the two terminals of the DC resistance tester respectively for resistance measurement to obtain a plurality of second measured values; and
    taking an average value of the first measured values and the second measured values as the first resistance value.

9. The defect detection method for a semi-conducting bedding layer of a power cable according to claim 1, wherein the calculating a second resistance value of the shield based on the length parameter and the corrugation pitch parameter comprises:
    connecting a conductor mesh belt to the shield and a power cable conductor at each end of the power cable separately;
    connecting conductor mesh belts of the shield and the power cable conductor at a first end of the power cable together, and connecting conductor mesh belts of the shield and the power cable conductor at a second end of the power cable to two terminals of a DC resistance tester respectively for resistance measurement to obtain a plurality of third measured values;
    connecting the conductor mesh belts of the shield and the power cable conductor at the second end of the power cable together, and connecting the conductor mesh belts of the shield and the power cable conductor at the first end of the power cable to the two terminals of the DC resistance tester respectively for resistance measurement to obtain a plurality of fourth measured values; and
    calculating the second resistance value based on an average value of the third measured values and the fourth measured values, the length parameter, and the corrugation pitch parameter.

10. The defect detection method for a semi-conducting bedding layer of a power cable according to claim 1, wherein the calculating a second resistance value of the shield based on the length parameter and the corrugation pitch parameter comprises:
    obtaining volume resistivity and a thickness of the shield; and
    calculating the second resistance value based on the length parameter, the corrugation pitch parameter, a second outer radius of the power cable containing the shield, and the volume resistivity and the thickness of the shield, wherein
    the second resistance value satisfies the following formula:

$$2nR_P = \frac{\delta_P d_{cable}}{\pi\left(d_{O'B}^2 - (d_{O'B} - t_P)^2\right)}$$

wherein $R_P$ represents the second resistance value; n represents a quantity of corrugations, and $$n = \left\lfloor \frac{d_{cable}}{d_{len}} \right\rfloor \text{ or } n = \left\lceil \frac{d_{cable}}{d_{len}} \right\rceil;$$

$d_{cable}$ represents the length parameter; $d_{len}$ represents the corrugation pitch parameter; $d_{O'B}$ represents the second outer radius of the power cable containing the shield; $\delta_P$ represents the volume resistivity of the shield; and $t_P$ represents the thickness of the shield.

11. The defect detection method for a semi-conducting bedding layer of a power cable according to claim 1, wherein the calculating a radial resistance value of the semi-conducting bedding layer based on the first resistance value and the second resistance value comprises:
constructing an initial equation of a preset radial resistance value based on the first resistance value and the second resistance value;
constructing a solving equation of the radial resistance value based on the first resistance value; and
calculating the radial resistance value based on the initial equation and the solving equation.

12. A defect detection apparatus for a semi-conducting bedding layer of a power cable, comprising:
a parameter obtaining module, configured to obtain a length parameter, a corrugation pitch parameter, radius parameters, and a thickness parameter of a power cable;
a first resistance value obtaining module, configured to obtain a first resistance value between a shield and a corrugated sheath;
a second resistance value calculation module, configured to calculate a second resistance value of the shield based on the length parameter and the corrugation pitch parameter;
a radial resistance value calculation module, configured to calculate a radial resistance value of a semi-conducting bedding layer based on the first resistance value and the second resistance value;
a contact angle determining module, configured to determine a contact angle of a critical point of contact between the corrugated sheath and the semi-conducting bedding layer based on the radius parameters and the thickness parameter;
an interpolation function obtaining module, configured to: take a plurality of points on a contact surface between the semi-conducting bedding layer and the corrugated sheath as base interpolation points; take an average value of the base interpolation points to obtain an interpolation data point; and obtain coordinates of the interpolation data point, and construct an interpolation function based on coordinates of a plurality of interpolation data points;
a volume resistivity calculation module, configured to calculate first volume resistivity of the semi-conducting bedding layer in a resistance approximation mode based on the interpolation function, the radial resistance value, and the contact angle, and calculate second volume resistivity of the semi-conducting bedding layer in a conductance approximation mode based on the interpolation function, the radial resistance value, and the contact angle; and
a defect detection module, configured to determine total volume resistivity of the semi-conducting bedding layer based on the first volume resistivity and the second volume resistivity, and compare the total volume resistivity with a preset evaluation parameter to obtain a defect detection result of the semi-conducting bedding layer.

13. A defect detection device for a semi-conducting bedding layer of a power cable, comprising a processor, a memory, and a computer program stored in the memory and configured to be executed by the processor, wherein the processor executes the computer program to implement the defect detection method for a semi-conducting bedding layer of a power cable according to claim 1.

14. A defect detection device for a semi-conducting bedding layer of a power cable, comprising a processor, a memory, and a computer program stored in the memory and configured to be executed by the processor, wherein the processor executes the computer program to implement the defect detection method for a semi-conducting bedding layer of a power cable according to claim 2.

15. A defect detection device for a semi-conducting bedding layer of a power cable, comprising a processor, a memory, and a computer program stored in the memory and configured to be executed by the processor, wherein the processor executes the computer program to implement the defect detection method for a semi-conducting bedding layer of a power cable according to claim 3.

16. A defect detection device for a semi-conducting bedding layer of a power cable, comprising a processor, a memory, and a computer program stored in the memory and configured to be executed by the processor, wherein the processor executes the computer program to implement the defect detection method for a semi-conducting bedding layer of a power cable according to claim 4.

17. A defect detection device for a semi-conducting bedding layer of a power cable, comprising a processor, a memory, and a computer program stored in the memory and configured to be executed by the processor, wherein the processor executes the computer program to implement the defect detection method for a semi-conducting bedding layer of a power cable according to claim 5.

18. A defect detection device for a semi-conducting bedding layer of a power cable, comprising a processor, a memory, and a computer program stored in the memory and configured to be executed by the processor, wherein the processor executes the computer program to implement the defect detection method for a semi-conducting bedding layer of a power cable according to claim 6.

19. A defect detection device for a semi-conducting bedding layer of a power cable, comprising a processor, a memory, and a computer program stored in the memory and configured to be executed by the processor, wherein the processor executes the computer program to implement the defect detection method for a semi-conducting bedding layer of a power cable according to claim 7.

20. A defect detection device for a semi-conducting bedding layer of a power cable, comprising a processor, a memory, and a computer program stored in the memory and configured to be executed by the processor, wherein the processor executes the computer program to implement the defect detection method for a semi-conducting bedding layer of a power cable according to claim 8.

* * * * *